US012494064B2

(12) United States Patent
Morrow et al.

(10) Patent No.: US 12,494,064 B2
(45) Date of Patent: Dec. 9, 2025

(54) IDENTIFYING, TRACKING, AND DISRUPTING UNMANNED AERIAL VEHICLES

(71) Applicant: Dedrone Holdings, Inc., Palo Alto, CA (US)

(72) Inventors: Alexander Morrow, Palo Alto, CA (US); Zachary Schmid, Palo Alto, CA (US); Joe Price, Palo Alto, CA (US); Mitch Meverden, Palo Alto, CA (US); Rene Seeber, Kassel (DE)

(73) Assignee: Dedrone Holdings, Inc., Palo Alto, CA (US)

( * ) Notice: Subject to any disclaimer, the term of this patent is extended or adjusted under 35 U.S.C. 154(b) by 524 days.

(21) Appl. No.: 17/961,599

(22) Filed: Oct. 7, 2022

(65) Prior Publication Data

US 2023/0043724 A1 Feb. 9, 2023

Related U.S. Application Data

(63) Continuation of application No. 16/864,854, filed on May 1, 2020, now Pat. No. 11,488,385, which is a
(Continued)

(51) Int. Cl.
*G06V 20/52* (2022.01)
*B64D 1/02* (2006.01)
(Continued)

(52) U.S. Cl.
CPC ............... *G06V 20/52* (2022.01); *B64D 1/02* (2013.01); *G06T 7/11* (2017.01); *G06V 10/25* (2022.01);
(Continued)

(58) Field of Classification Search
CPC .... G06V 20/52; G06V 10/25; G06V 2201/07; G06T 7/11
See application file for complete search history.

(56) References Cited

U.S. PATENT DOCUMENTS 4,584,578 A 4/1986 Brauns et al.
5,001,771 A 3/1991 New
(Continued)

FOREIGN PATENT DOCUMENTS

WO 2007012147 A2 2/2007
WO 2007012148 A1 2/2007
(Continued)

OTHER PUBLICATIONS

"5 Antenna Portable 2G 3G Mobile Phone WiFi GPS Signal Jammer," CDMA/GSM|DGS/PCS_3G_WiFi_GPS Signal Blocker Portable Jammer, 2015, 3 Pages.
(Continued)

*Primary Examiner* — Ayodeji O Ayotunde
(74) *Attorney, Agent, or Firm* — Bradley Arant Boult Cummings LLP; Daniel E. Sineway, Esq.; Adam J. Thompson., Esq.

(57) ABSTRACT

Systems, methods, and apparatus for identifying, tracking, and disrupting UAVs are described herein. A tracking system can receive sensor data associated with an object in a particular airspace from one or more radio frequency sensors. The tracking system can analyze the sensor data relating to the object to identify a type of RF signal being used by the object. A portable countermeasure device can generate one or more disruption signals on one or more targeted bands of spectrum based on the type of RF signal being used by the object.

20 Claims, 9 Drawing Sheets

EXEMPLARY PORTABLE COUNTERMEASURE
DEVICE TRANSMISSION PROCESS

Related U.S. Application Data continuation-in-part of application No. 16/819,401, filed on Mar. 16, 2020, now abandoned, which is a continuation of application No. 16/264,085, filed on Jan. 31, 2019, now Pat. No. 10,621,443, which is a continuation of application No. 15/346,269, filed on Nov. 8, 2016, now Pat. No. 10,229,329.

(51) Int. Cl.

| | | |
|---|---|---|
| *G06T 7/11* | (2017.01) | |
| *G06V 10/25* | (2022.01) | |
| *G08G 5/22* | (2025.01) | |
| *G08G 5/55* | (2025.01) | |
| *G08G 5/57* | (2025.01) | |
| *G08G 5/59* | (2025.01) | |
| *G08G 5/72* | (2025.01) | |
| *B64C 39/02* | (2023.01) | |
| *G06T 7/194* | (2017.01) | |

(52) U.S. Cl.
CPC ............... *G08G 5/22* (2025.01); *G08G 5/55* (2025.01); *G08G 5/57* (2025.01); *G08G 5/59* (2025.01); *G08G 5/727* (2025.01); *B64C 39/024* (2013.01); *G06T 7/194* (2017.01); *G06T 2207/10016* (2013.01); *G06T 2207/10024* (2013.01); *G06T 2207/20104* (2013.01); *G06T 2207/30212* (2013.01); *G06T 2207/30232* (2013.01); *G06V 2201/07* (2022.01)

(56) References Cited

U.S. PATENT DOCUMENTS

| | | |
|---|---|---|
| 5,287,110 A | 2/1994 | Tran |
| 5,822,429 A | 10/1998 | Casabona et al. |
| 5,828,626 A | 10/1998 | Castile et al. |
| 5,896,105 A | 4/1999 | Murphy et al. |
| 6,223,461 B1 | 5/2001 | Mardirossian |
| 6,230,371 B1 | 5/2001 | Chu |
| 6,396,432 B2 | 5/2002 | Riemschneider et al. |
| 6,480,144 B1 | 11/2002 | Miller et al. |
| 6,977,598 B2 | 12/2005 | Longbottom |
| 7,050,755 B2 | 5/2006 | Kline |
| 7,099,369 B2 | 8/2006 | Karlsson |
| 7,218,759 B1 | 5/2007 | Ho et al. |
| 7,318,368 B2 | 1/2008 | Ham et al. |
| 7,423,575 B2 | 9/2008 | Duff et al. |
| 7,489,264 B2 | 2/2009 | Ferm et al. |
| 7,554,481 B2 | 6/2009 | Cohen et al. |
| 7,574,168 B2 | 8/2009 | Twitchell, Jr. et al. |
| 7,697,885 B2 | 4/2010 | Stoddard |
| 7,698,846 B2 | 4/2010 | Do Amarante et al. |
| 7,715,597 B2 | 5/2010 | Costache et al. |
| 7,783,246 B2 | 8/2010 | Twitchell, Jr. et al. |
| 7,784,390 B1 | 8/2010 | Lowell et al. |
| 8,001,901 B2 | 8/2011 | Bass |
| 8,135,661 B2 | 3/2012 | Olsson |
| 8,145,119 B2 | 3/2012 | Cornwell |
| 8,170,467 B2 | 5/2012 | Stoddard |
| 8,203,109 B2 | 6/2012 | Taylor et al. |
| 8,269,957 B2 | 9/2012 | Saban et al. |
| 8,301,075 B2 | 10/2012 | Sherman et al. |
| D672,832 S | 12/2012 | Gerwig |
| 8,388,243 B1 | 3/2013 | Smith |
| 8,615,190 B2 | 12/2013 | Lu |
| 8,903,304 B2 | 12/2014 | Coleman et al. |
| D722,672 S | 2/2015 | Juarez |
| 8,971,441 B2 | 3/2015 | Dowla et al. |
| 9,071,385 B2 | 6/2015 | Delaveau et al. |
| D745,103 S | 12/2015 | Corsi et al. |
| 9,201,421 B1 | 12/2015 | Fairfield et al. |
| 9,207,049 B2 | 12/2015 | Rovinsky |
| D763,396 S | 8/2016 | Juarez |
| 9,404,750 B2 | 8/2016 | Rios |
| D769,394 S | 10/2016 | Young et al. |
| D779,012 S | 2/2017 | Abbott |
| D780,277 S | 2/2017 | Barnett |
| D787,619 S | 5/2017 | Young et al. |
| 9,689,976 B2 | 6/2017 | Parker et al. |
| 9,715,009 B1 | 7/2017 | Parker et al. |
| 9,816,783 B1 | 11/2017 | Means et al. |
| D814,591 S | 4/2018 | Koçgür et al. |
| D814,598 S | 4/2018 | Monti |
| 9,977,117 B2 | 5/2018 | Parker et al. |
| 10,020,909 B2 | 7/2018 | Stamm et al. |
| D826,204 S | 8/2018 | Ozkaner et al. |
| 10,043,405 B1 | 8/2018 | Chartier et al. |
| 10,103,835 B2 | 10/2018 | Morrow et al. |
| 10,156,631 B2 | 12/2018 | Parker et al. |
| 10,229,329 B2 | 3/2019 | Seeber et al. |
| 10,231,101 B2 | 3/2019 | Gozalvez-Serrano et al. |
| 10,237,012 B2 | 3/2019 | Morrow et al. |
| 10,281,570 B2 | 5/2019 | Parker et al. |
| 10,302,759 B1 | 5/2019 | Arteaga |
| D855,138 S | 7/2019 | Cheng et al. |
| D855,730 S | 8/2019 | Stamm et al. |
| D855,731 S | 8/2019 | Stamm et al. |
| 10,505,622 B1 | 12/2019 | Stein et al. |
| 10,567,107 B2 | 2/2020 | Morrow et al. |
| 10,574,384 B2 | 2/2020 | Morrow et al. |
| 10,621,443 B2 | 4/2020 | Seeber et al. |
| 10,670,696 B2 | 6/2020 | Parker et al. |
| 10,739,451 B1 | 8/2020 | Parker et al. |
| 10,790,925 B2 | 9/2020 | Morrow et al. |
| 10,795,010 B2 | 10/2020 | Parker et al. |
| 10,907,940 B1 | 2/2021 | Parker et al. |
| 11,095,392 B2 | 8/2021 | Morrow et al. |
| 2003/0011706 A1 | 1/2003 | Chang et al. |
| 2003/0058112 A1 | 3/2003 | Gleine |
| 2003/0110675 A1 | 6/2003 | Garrett et al. |
| 2005/0011101 A1 | 1/2005 | Gooder |
| 2005/0041728 A1 | 2/2005 | Karlsson |
| 2006/0002625 A1 | 1/2006 | Haven et al. |
| 2006/0200658 A1 | 9/2006 | Penkethman |
| 2006/0226950 A1 | 10/2006 | Kanou et al. |
| 2007/0063886 A1 | 3/2007 | Brumley et al. |
| 2007/0092143 A1 | 4/2007 | Higgins |
| 2008/0036659 A1 | 2/2008 | Smith et al. |
| 2008/0174469 A1 | 7/2008 | Stark et al. |
| 2009/0214205 A1 | 8/2009 | Clark et al. |
| 2009/0287363 A1 | 11/2009 | Young |
| 2010/0194622 A1 | 8/2010 | Clingman et al. |
| 2010/0315281 A1 | 12/2010 | Askelson et al. |
| 2011/0000389 A1 | 1/2011 | Fullerton |
| 2011/0176674 A1 | 7/2011 | Romain |
| 2011/0273322 A1 | 11/2011 | Melum et al. |
| 2013/0015260 A1 | 1/2013 | Schulte |
| 2013/0023201 A1 | 1/2013 | Coleman et al. |
| 2013/0329052 A1 | 12/2013 | Chew |
| 2014/0055298 A1 | 2/2014 | Abl |
| 2014/0145993 A1 | 5/2014 | Nakayama |
| 2014/0147116 A1 | 5/2014 | Krupkin |
| 2014/0157209 A1 | 6/2014 | Dalal et al. |
| 2014/0266851 A1 | 9/2014 | Fink et al. |
| 2014/0270350 A1 | 9/2014 | Rodriguez-Serrano et al. |
| 2014/0272807 A1 | 9/2014 | Guenther et al. |
| 2014/0327564 A1 | 11/2014 | Sampigethaya |
| 2015/0193101 A1 | 7/2015 | Mannon et al. |
| 2015/0229434 A1 | 8/2015 | Shawn |
| 2015/0302858 A1* | 10/2015 | Hearing ............. G01H 1/00 381/58 |
| 2015/0331099 A1 | 11/2015 | Wu et al. |
| 2015/0350914 A1 | 12/2015 | Baxley et al. |
| 2016/0202025 A1 | 7/2016 | Di Mauro Lorenzi |
| 2016/0245907 A1 | 8/2016 | Parker et al. |
| 2017/0103659 A1 | 4/2017 | Jin |
| 2017/0109878 A1 | 4/2017 | Yang et al. |
| 2017/0148332 A1 | 5/2017 | Ziemba et al. |
| 2017/0192089 A1* | 7/2017 | Parker ............. G08G 5/727 |
| 2017/0237520 A1 | 8/2017 | Morrow et al. |
| 2017/0250778 A1 | 8/2017 | Stamm et al. |

(56) References Cited

U.S. PATENT DOCUMENTS

| | | | |
|---|---|---|---|
| 2017/0278404 | A1 | 9/2017 | Gordon et al. |
| 2017/0301248 | A1 | 10/2017 | Silverman |
| 2017/0358214 | A1 | 12/2017 | Scarlatti et al. |
| 2018/0129881 | A1 | 5/2018 | Seeber et al. |
| 2018/0257780 | A1 | 9/2018 | Sassinsky |
| 2019/0003807 | A1 | 1/2019 | Whitmarsh et al. |
| 2019/0019420 | A1 | 1/2019 | X et al. |
| 2019/0020404 | A1 | 1/2019 | Russell |
| 2019/0103030 | A1 | 4/2019 | Banga et al. |
| 2019/0266904 | A1 | 8/2019 | Kant et al. |
| 2020/0062392 | A1 | 2/2020 | Yoon |
| 2020/0353894 | A1 | 11/2020 | Obaidi |

FOREIGN PATENT DOCUMENTS

| | | |
|---|---|---|
| WO | 2014021970 A2 | 2/2014 |
| WO | 20160122739 A2 | 8/2016 |
| WO | 2017053693 A1 | 3/2017 |

OTHER PUBLICATIONS

Anonymous: "How To: Building a BlueSniper Rifle—Part 1," Small Net Builder, Mar. 8, 2005, 41 Pages, XP055603917, [Retrieved on May 13, 2019] Retrieved from URL: https://www.smallnetbuilder.com/wireless/wireless-howto/24256-howtobluesniperpt1.

Anonymous: "WiFi Sniper Rifle," Medic For Life, Jun. 21, 2011, pp. 1-3, XP055604788, [Retrieved on May 10, 2019] Retrieved from URL: http://medicforlife.blogspot.com/2011/06/wifi-sniper-rifle.html.

Benchoff B., "Sniping 2.4GHZ," Hackaday, Apr. 21, 2014, 20 Pages, XP055603923, [Retrieved on May 10, 2019] URL: https://hackaday.com/2014/04/21/sniping-2-4ghz/.

"Clear Sky," Jammers e-RAKE, 2007, 6 Pages, Retrieved from URL: http://www.hypercable.fr.

"Search Product by Functions," Cell Phone Jammer Search by Functions, 2015, 5 Pages, Retrieved from URL: http://www.jammerfromchina.com.

ESATO: "Bluetooth-Cracking Gun," Aug. 6, 2004, 2 Pages, XP055604795, [Retrieved on May 10, 2019] Retrieved from URL: https://www.defcon.org/html/links/dc_press/archives/12/esato_bluetoothcracking.htm.

Examination Report for Australian Application No. 2016325606, dated Dec. 3, 2018.

Fitriyani Y., et al., "Yagi Antenna Design for Signal Phone Jammer," 2012, 6 Pages.

"Handheld Selectable Bluetooth GPSL1 GPSL2 GPSL5 3G Mobile Phone Signal Jammer," 2015, 3 Pages, Retrieved from URL: http://www.jammerfromchina.com.

"Handheld Style Powerful Selectable WiFi GPS Jammer & All Wireless Bug Camera Blocker," 3W High Power Portable All Wireless Bug Camera, vol. 2, 2015, 3 Pages, Retrieved from URL: http://www.jammerfromchina.com.

"High Gain Directional Antennas for High Power Adjustable WiFi Phone Jammer," 2014, 2 Pages, Retrieved from URL: http://www.alljammers.com.

International Preliminary Report on Patentability for International Application No. PCT/US2016/053291, mailed Apr. 5, 2018, 8 Pages.

International Preliminary Report on Patentability for International Application No. PCT/US2018/032732, mailed Nov. 28, 2019, 8 Pages.

International Preliminary Report on Patentability for International Application No. PCT/US2019/017750, mailed Dec. 24, 2020, 8 Pages.

International Search Report and Written Opinion for International Application No. PCT/US2016/053291, mailed Dec. 20, 2016, 10 Pages.

International Search Report and Written Opinion for International Application No. PCT/US2018/032732, mailed Aug. 8, 2018, 10 Pages.

International Search Report and Written Opinion for International Application No. PCT/US2019/017750, mailed May 14, 2019, 10 Pages.

Jisrawi A., "Drone Jammer Instruction Set," 10 Pages.

"Newest All-in-one Portable Selectable 2G 3G 4G Cell Phone Blocker GPS Jammer," New Arrival All-in-one Handheld GPS 2G 3G 4G Mobile Phone, vol. 5, 2015, 3 Pages, Retrieved from URL: http://www.jammerfromchina.com.

"Phone Jammer-Wholesale Jammer-DropShip From China," vol. 7, 2015, 3 Pages, Retrieved from URL: http://www.jammerfromchina.com.

"RF Jammer," Directional RF Jammer for Blocking Cellular Phone Calls, 2011, 3 Pages, Retrieved from URL: http://www.secintel.com.

Scott H., "Hack Rifle," Hscott, Jan. 19, 2015, 8 Pages, XP055603905, [Retrieved on May 10, 2019] Retrieved from URL: https://www.hscott.net/hack-rifle/.

Wired: "Security Cavities Ail Bluetooth," Aug. 6, 2004, Retrieved from URL: https://www.wired.com/2004/08/security-cavities-ail-bluetooth/.

"Wireless 50W High Power Explosionproof Signal Jammer", 3G Mobile Phone Jammer, vol. 1, 3 Pages, Retrieved from URL: http://www.jammerfromchina.com.

"World's First Fully Integrated Anti-UAV Defence System (AUDS) Now Features Quad Band RF Inhibitor and Optical Disruptor," Sep. 8, 2015, 6 Pages, Retrieved from URL: https://www.blighter.com/worlds-first-fully-integrated-anti-uav-defence-system-auds-now-features-quad-band-rf-inhibitor-and-optical-disruptor/.

Youtube: "AUDS-Anti-UAV Defence System," May 11, 2019, 3 Pages, Retrieved from URL: https://www.youtube.com/watchtime_continue=66N=P8aZ0zWX3SA.

Final Office Action for U.S. Appl. No. 15/970,110, mailed Oct. 3, 2018, 8 Pages.

Final Office Action for U.S. Appl. No. 16/005,905, mailed Jun. 10, 2019, 12 Pages.

Final Office Action for U.S. Appl. No. 17/236,682, mailed Oct. 26, 2021, 9 Pages.

Non-Final Office Action for U.S. Appl. No. 15/274,021, mailed Jun. 27, 2017, 10 Pages.

Non-Final Office Action for U.S. Appl. No. 15/596,842, mailed Oct. 5, 2017, 7 Pages.

Non-Final Office Action for U.S. Appl. No. 15/970,110, mailed Jun. 13, 2018, 10 Pages.

Non-Final Office Action for U.S. Appl. No. 16/005,905, mailed Dec. 9, 2019, 07 Pages.

Non-Final Office Action for U.S. Appl. No. 16/005,905, mailed Dec. 26, 2018, 12 Pages.

Non-Final Office Action for U.S. Appl. No. 16/235,280, mailed May 14, 2019, 14 Pages.

Non-Final Office Action for U.S. Appl. No. 16/863,515, mailed Jun. 2, 2021, 8 Pages.

Non-Final Office Action for U.S. Appl. No. 16/864,854, mailed Oct. 14, 2021, 13 Pages.

Non-Final Office Action for U.S. Appl. No. 17/236,682, mailed Jul. 6, 2021, 14 Pages.

Notice of Allowance for U.S. Appl. No. 15/274,021, mailed Apr. 5, 2018, 4 Pages.

Notice of Allowance for U.S. Appl. No. 15/274,021, mailed Feb. 6, 2018, 2 Pages.

Notice of Allowance for U.S. Appl. No. 15/274,021, mailed Jan. 16, 2018, 7 Pages.

Notice of Allowance for U.S. Appl. No. 15/274,021, mailed Nov. 27, 2017, 9 Pages.

Notice of Allowance for U.S. Appl. No. 15/596,842, mailed Mar. 6, 2018, 7 Pages.

Notice of Allowance for U.S. Appl. No. 15/970,110, mailed Nov. 5, 2018, 7 Pages.

Notice of Allowance for U.S. Appl. No. 15/970,110, mailed Jan. 9, 2019, 2 Pages.

(56) References Cited

OTHER PUBLICATIONS

Notice of Allowance for U.S. Appl. No. 16/005,905, mailed May 27, 2020, 7 Pages.
Notice of Allowance for U.S. Appl. No. 16/235,280, mailed Oct. 9, 2019, 8 Pages.
Notice of Allowance for U.S. Appl. No. 16/274,325, mailed Oct. 16, 2019, 9 Pages.
Notice of Allowance for U.S. Appl. No. 16/863,515, mailed Oct. 1, 2021, 5 Pages.
Notice of Allowance for U.S. Appl. No. 16/864,854, mailed Jun. 27, 2022, 10 Pages.
Notice of Allowance for U.S. Appl. No. 17/236,682, mailed Nov. 29, 2021, 8 Pages.
Notice of Allowance for U.S. Appl. No. 29/610,100, mailed Apr. 11, 2019, 5 Pages.
Notice of Allowance for U.S. Appl. No. 29/610,106, mailed Apr. 11, 2019, 5 Pages.
Notice of Allowance for U.S. Appl. No. 29/610,107, mailed Jul. 10, 2019, 5 Pages.
Notice of Allowance for U.S. Appl. No. 29/610,107, mailed Apr. 11, 2019, 5 Pages.
Notice of Allowance for U.S. Appl. No. 29/610,107, mailed Dec. 19, 2019, 2 Pages.
Notice of Allowance for U.S. Appl. No. 29/642,228, mailed Sep. 11, 2019, 5 Pages.
Notice of Allowance for U.S. Appl. No. 29/642,233, mailed Sep. 11, 2019, 5 Pages.
Notice of Allowance for U.S. Appl. No. 29/680,172, mailed Sep. 9, 2019, 6 Pages.
Notice of Allowance for U.S. Appl. No. 29/680,173, mailed Sep. 10, 2019, 6 Pages.
Giering, M., et al., "Multi-modal Sensor Registration for Vehicle Perception via Deep Neural Networks," arXiv:1412.7006v2 [cs.CV] Jul. 8, 2015.
Non-Final Office Action for U.S. Appl. No. 17/889,897, mailed Oct. 17, 2024, 17 Pages.

* cited by examiner

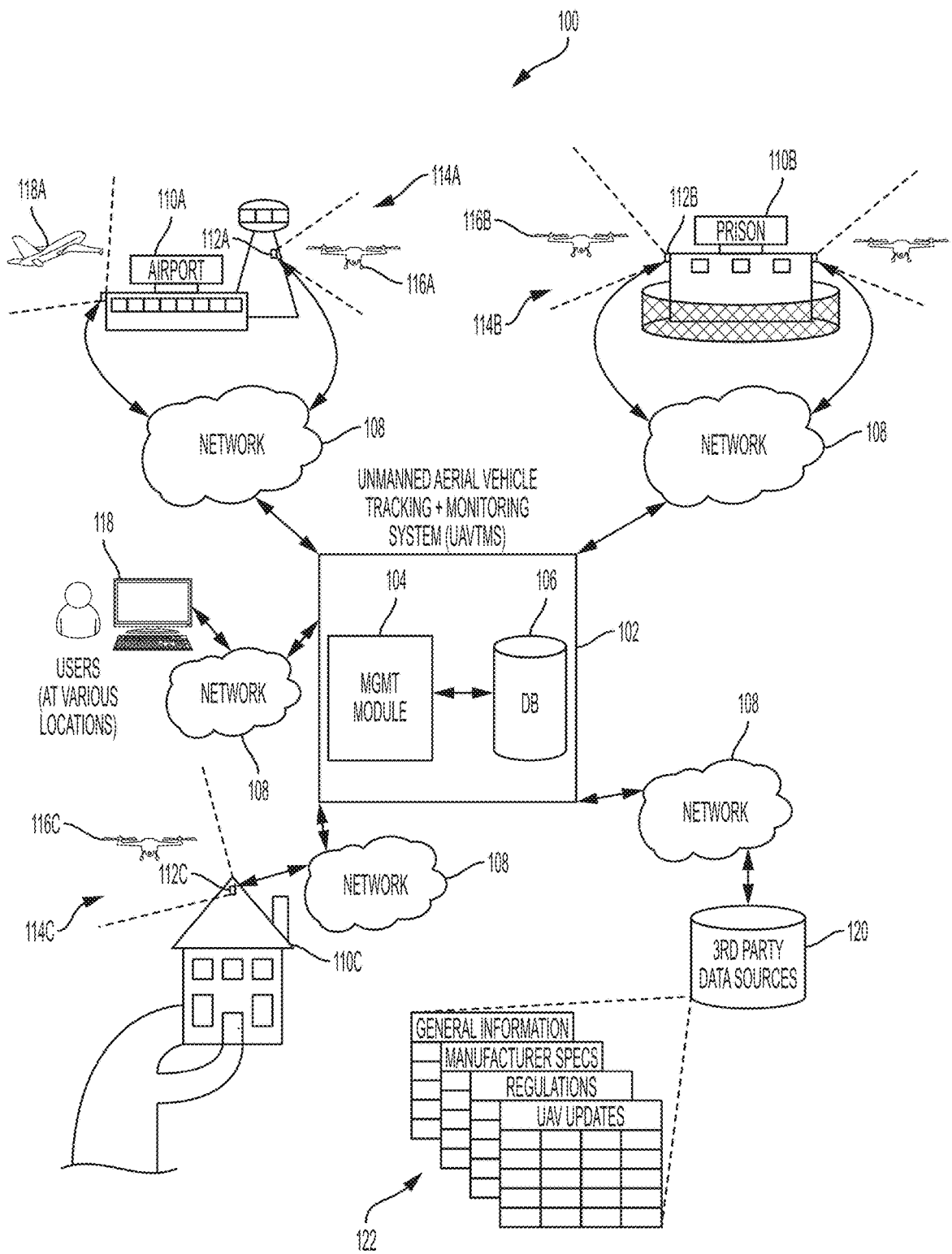
FIG. 1: OVERVIEW OF UNMANNED AERIAL VEHICLE TRACKING AND MONITORING SYSTEM

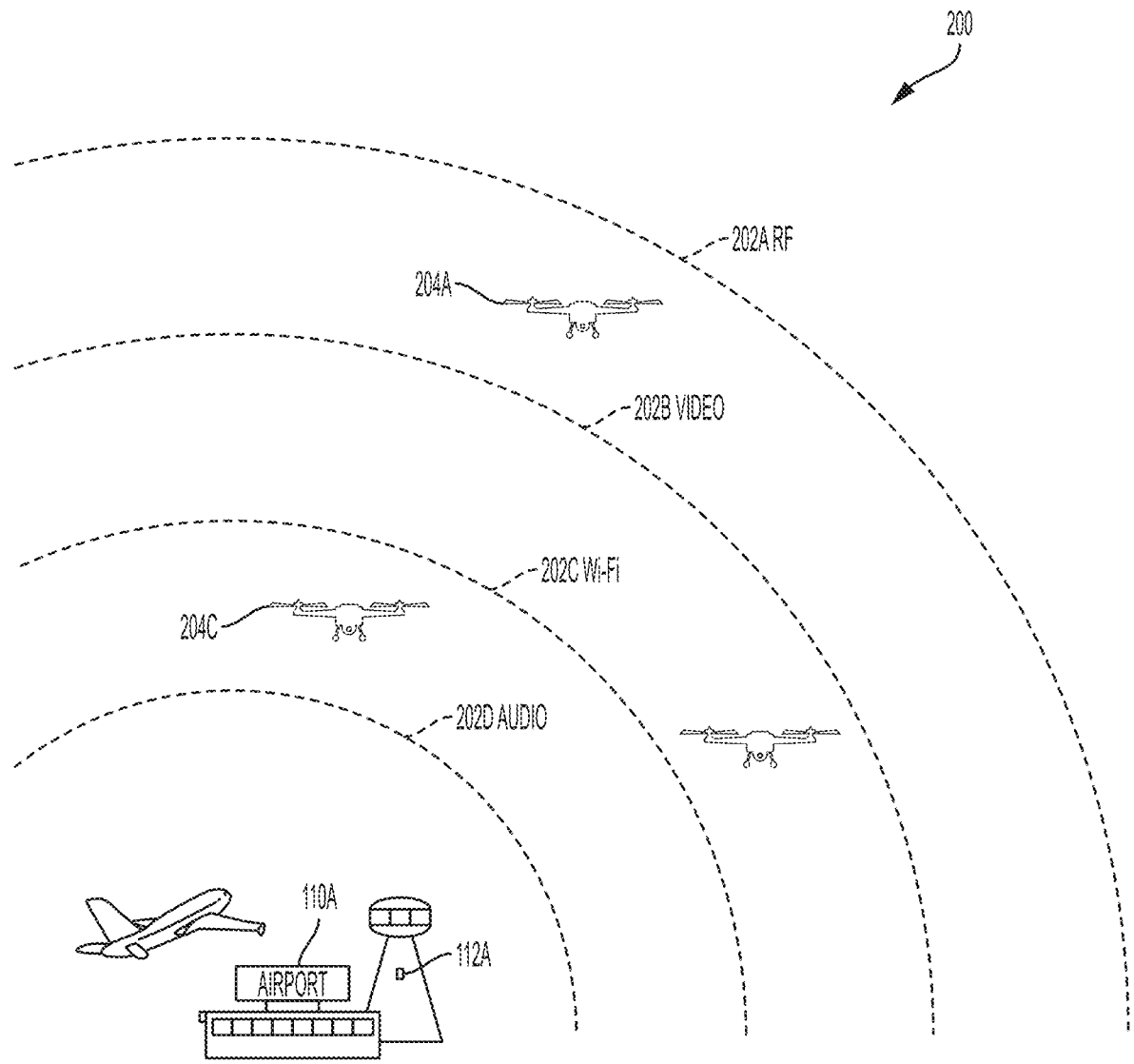
FIG. 2: EXEMPLARY SENSOR RANGES

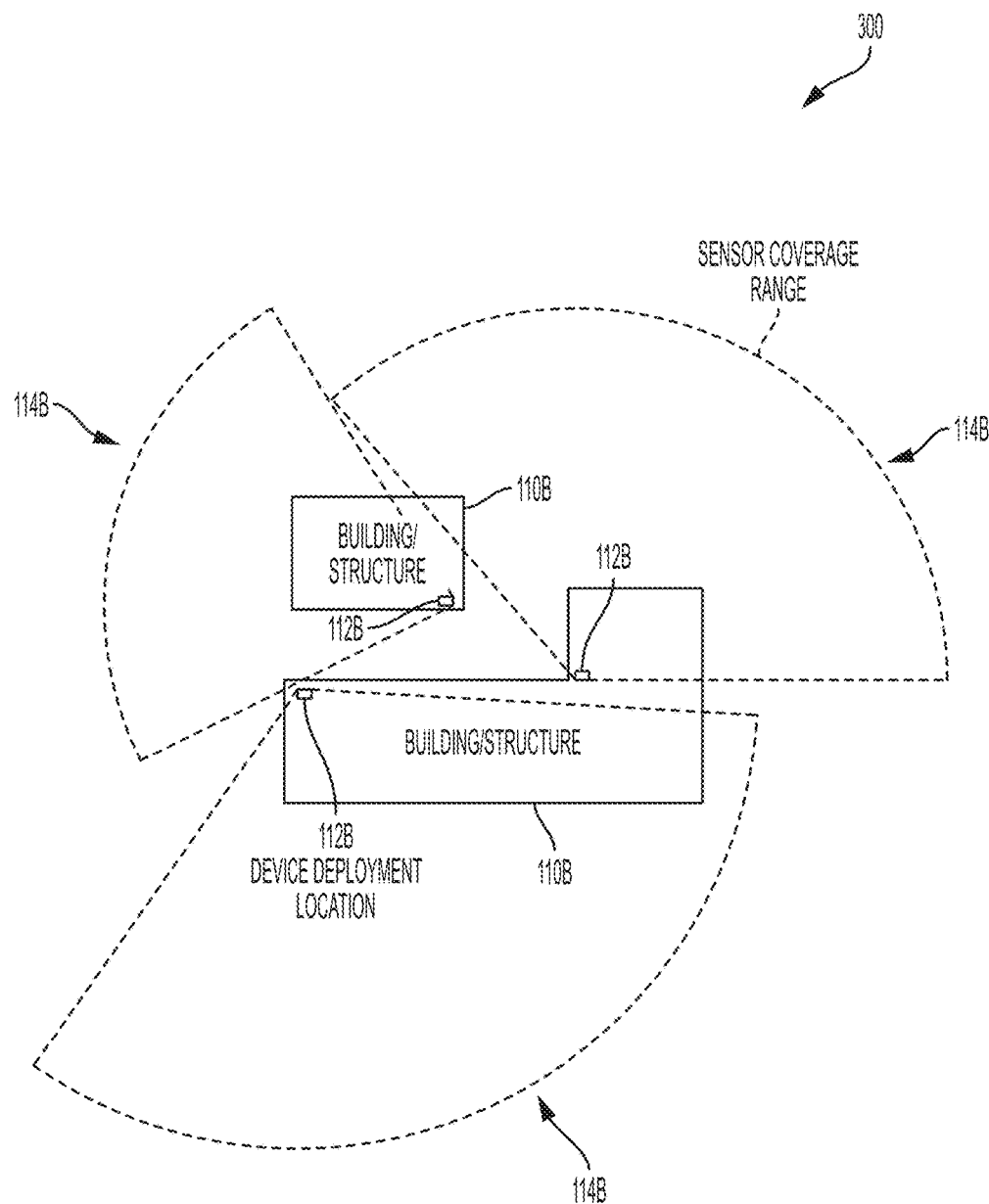
FIG. 3: EXEMPLARY SENSOR RANGES AND DIRECTED COVERAGE

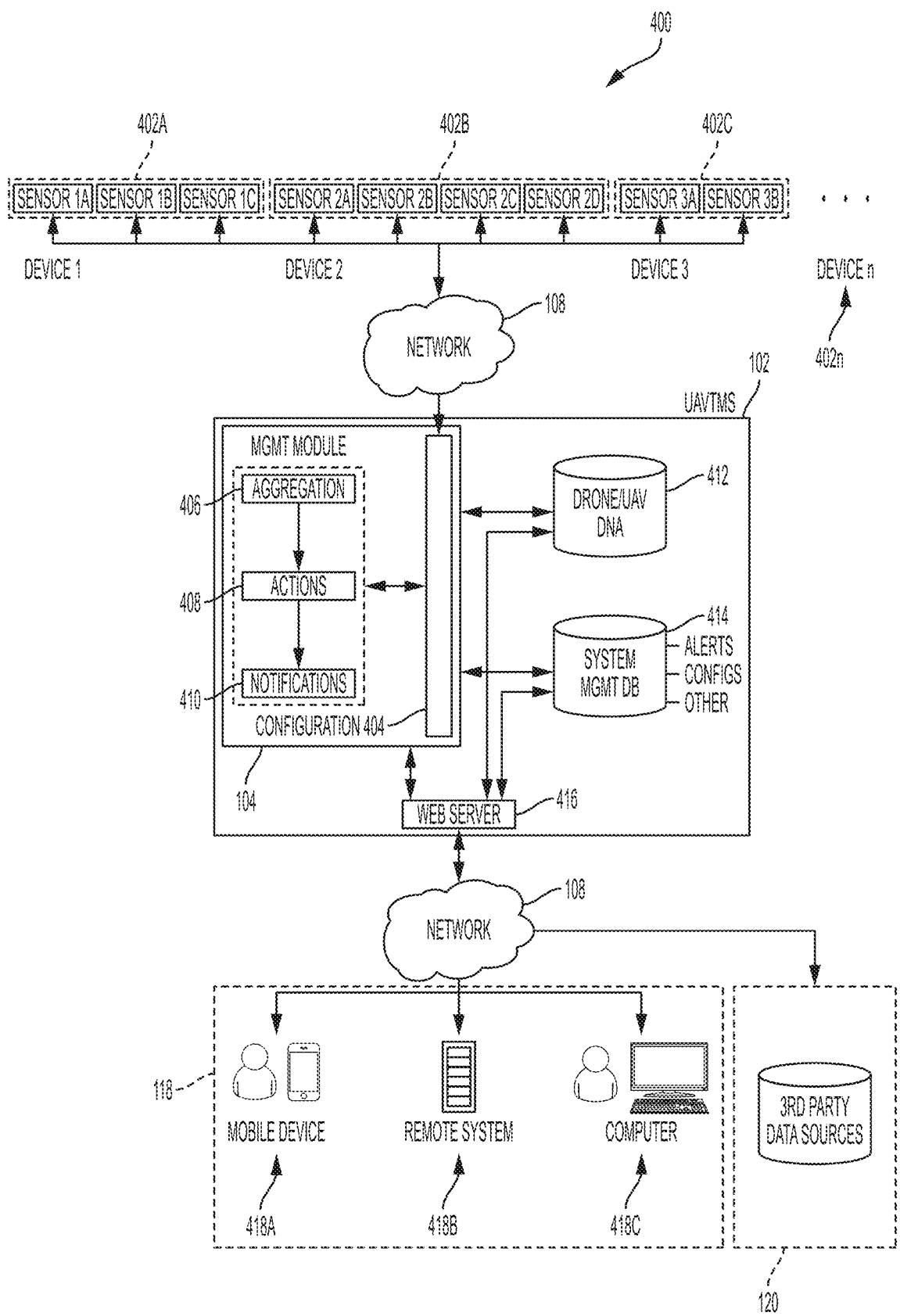
FIG. 4: EXEMPLARY SYSTEM ARCHITECTURE

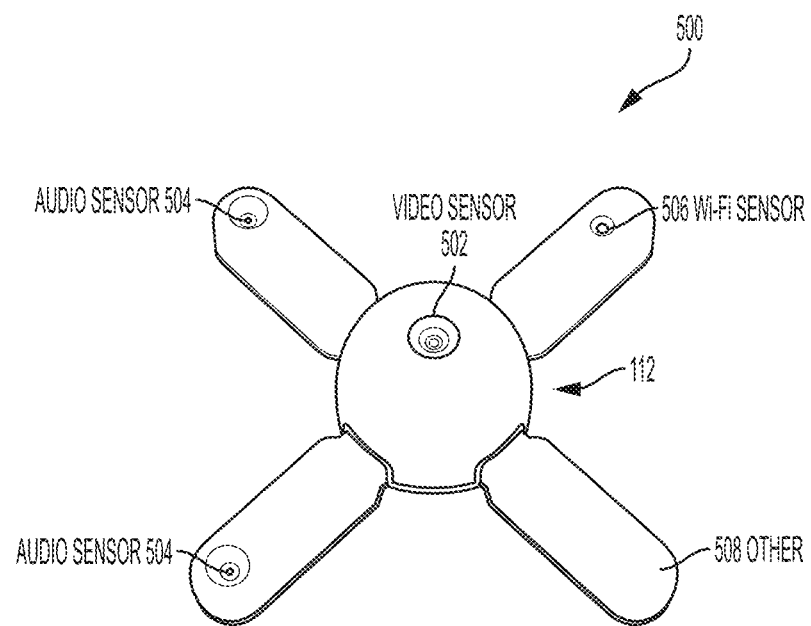
FIG. 5A: EXEMPLARY SENSOR DEVICE
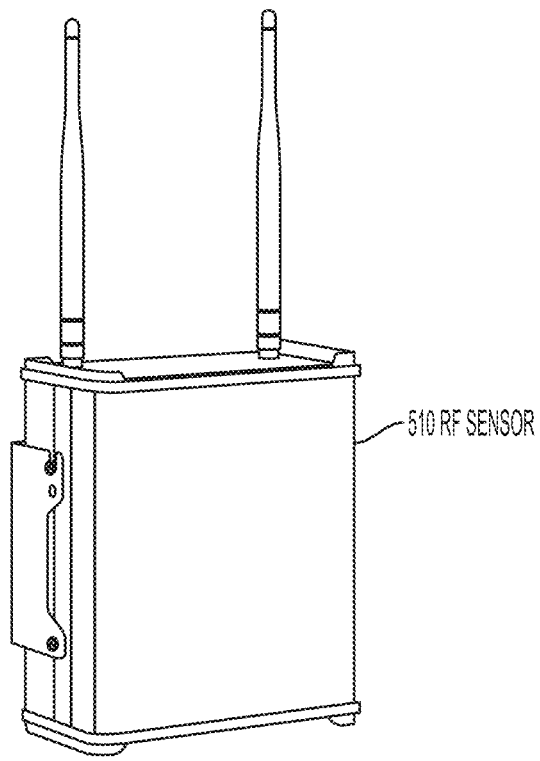
FIG. 5B: EXEMPLARY RF SENSOR DEVICE

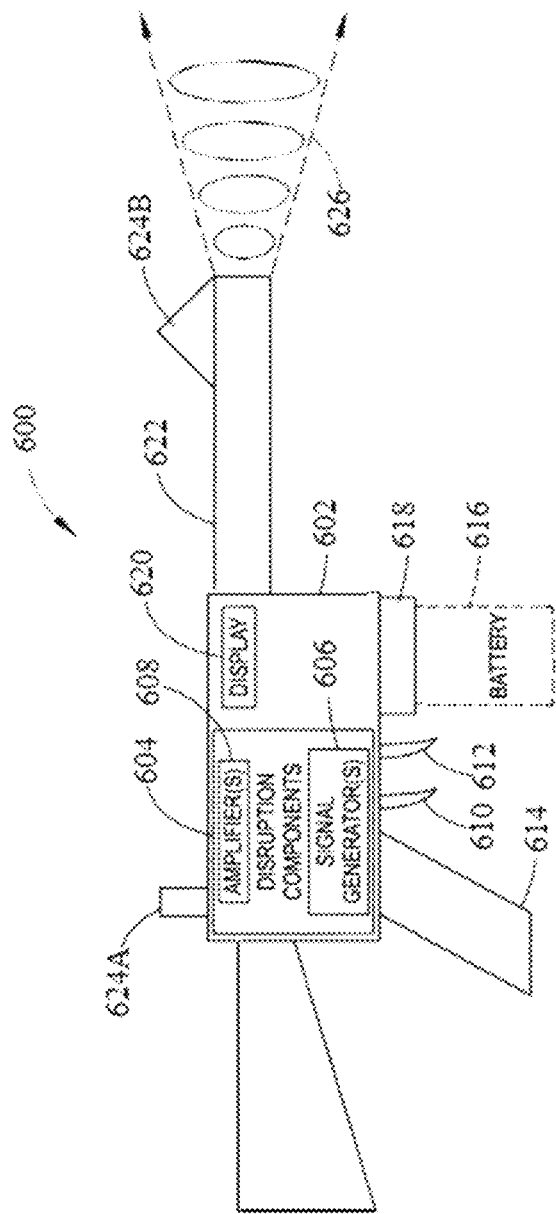
FIG. 6: EXEMPLARY PORTABLE COUNTERMEASURE DEVICE

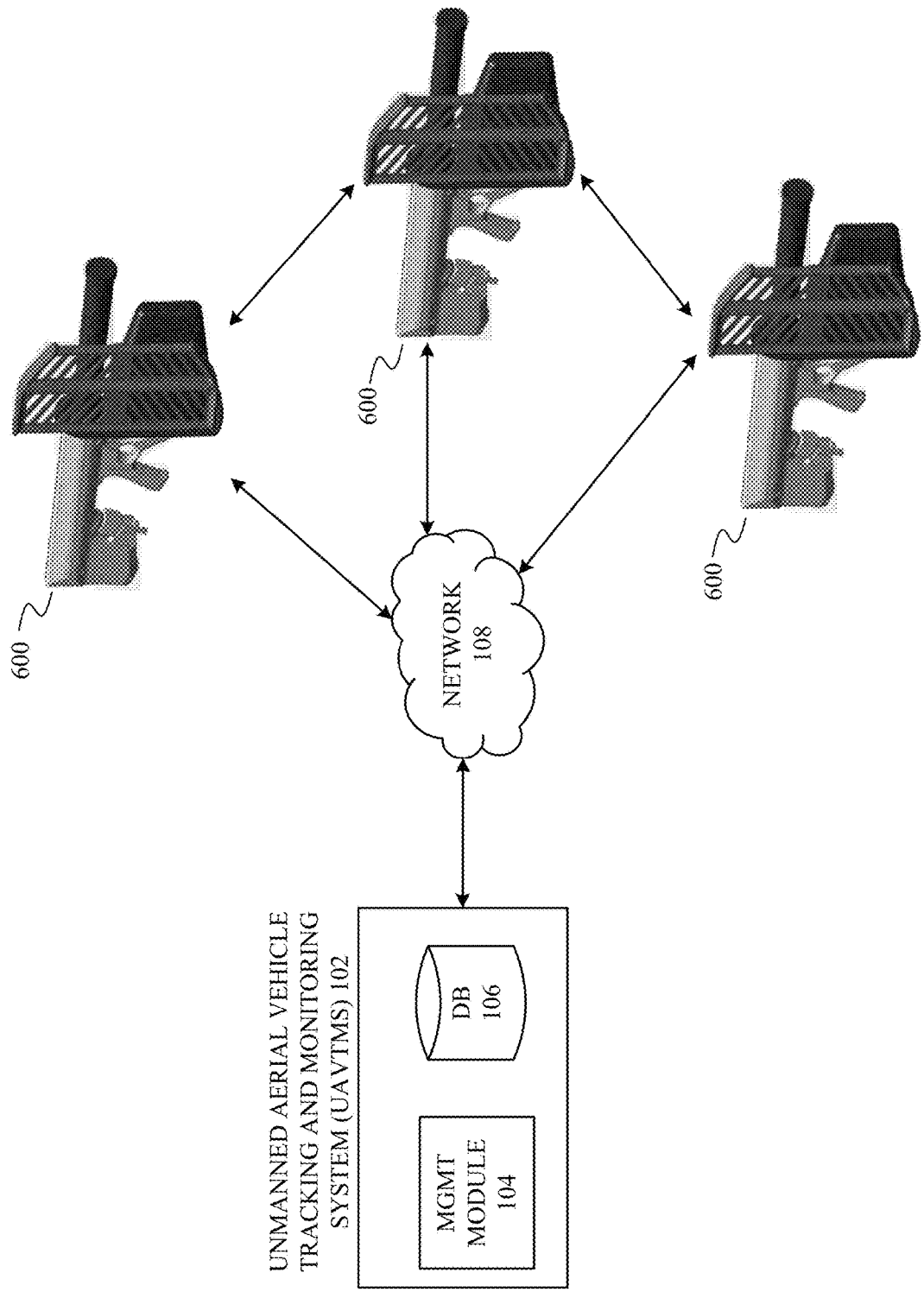
FIG. 7: EXEMPLARY SYSTEM AND PORTABLE COUNTERMEASURE DEVICE COMMUNICATION LINK

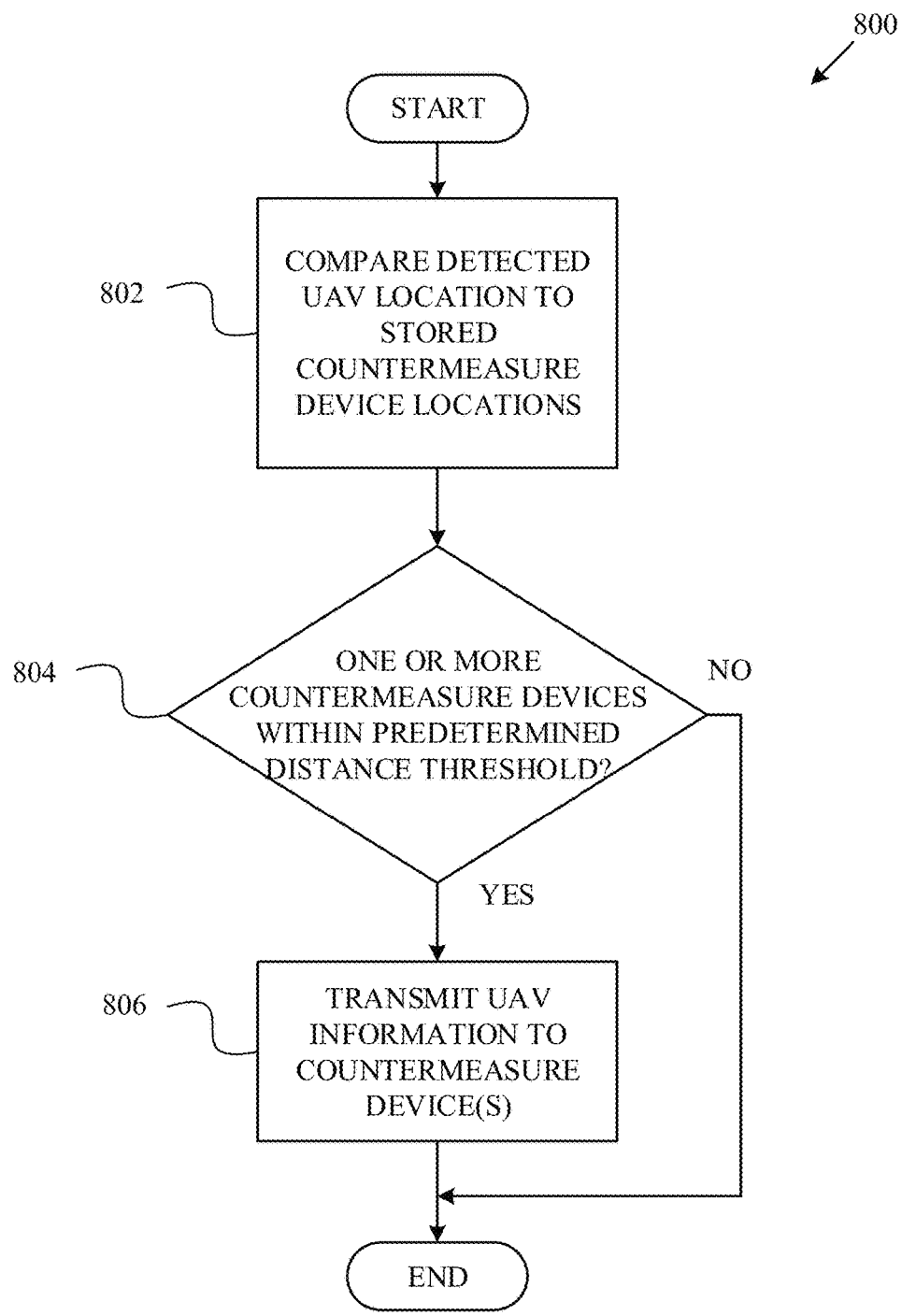
FIG. 8: EXEMPLARY PORTABLE COUNTERMEASURE DEVICE SELECTION PROCESS

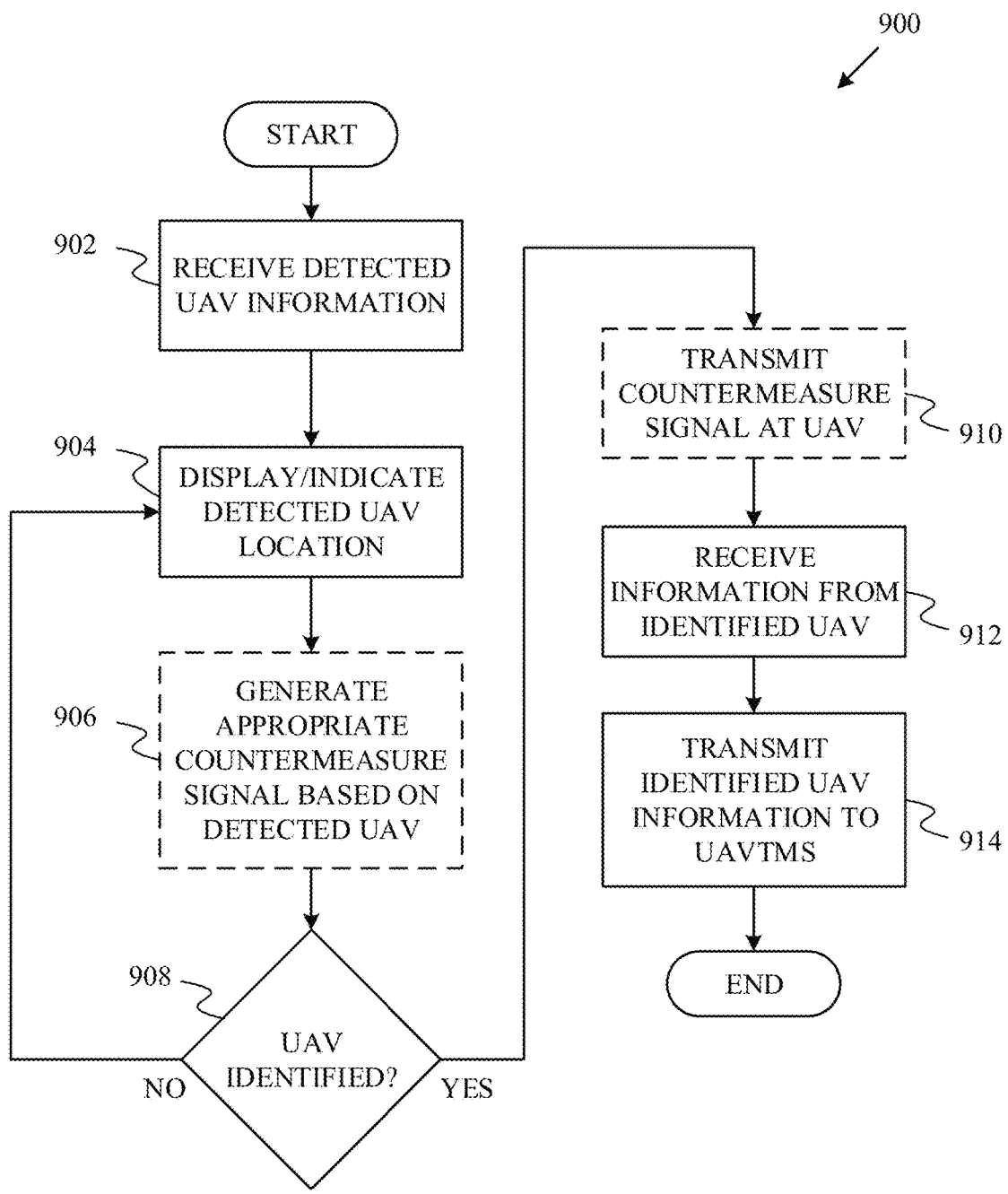
FIG. 9: EXEMPLARY PORTABLE COUNTERMEASURE DEVICE TRANSMISSION PROCESS

IDENTIFYING, TRACKING, AND DISRUPTING UNMANNED AERIAL VEHICLES

CROSS-REFERENCE TO RELATED APPLICATIONS

This application is a continuation of U.S. application Ser. No. 16/864,854, filed May 1, 2020, and entitled "IDENTIFYING, TRACKING, AND DISRUPTING UNMANNED AERIAL VEHICLES," which is a continuation-in-part of, and claims the benefit of and priority to:

U.S. application Ser. No. 16/819,401, filed Mar. 16, 2020, and entitled "Systems, Methods, Apparatuses, and Devices For Identifying, Tracking, and Managing Unmanned Aerial Vehicles," which is a Continuation of U.S. Pat. No. 10,621,443, filed Jan. 31, 2019, and entitled "Systems, Methods, Apparatuses, And Devices For Identifying, Tracking, And Managing Unmanned Aerial Vehicles," which is a Continuation of U.S. Pat. No. 10,229,329, filed Nov. 8, 2016, and entitled "Systems, Methods, Apparatuses, and Devices For Identifying, Tracking, and Managing Unmanned Aerial Vehicles,"; and U.S. application Ser. No. 16/793,597, filed Feb. 18, 2020, and entitled "Handheld Portable Countermeasure Device Against Unmanned Systems," which is a Continuation of U.S. Pat. No. 10,574,384, filed Feb. 13, 2019, and entitled "Dual-Grip Portable Countermeasure Device Against Unmanned Systems," which is a Continuation-in-Part to U.S. application Ser. No. 16/005,905, filed Jun. 12, 2018, and entitled "Dual-Grip Portable Countermeasure Device Against Unmanned Systems," which is a Continuation of U.S. Pat. No. 10,020,909, filed May 16, 2017, and entitled "Dual-Grip Portable Countermeasure Device Against Unmanned Systems," which is a Continuation-in-Part to U.S. Pat. No. 10,103,835, filed Sep. 23, 2016, and entitled "Portable Countermeasure Device Against Unmanned Systems," which claims priority to and the benefit of U.S. Provisional Patent Application No. 62/222,475, filed Sep. 23, 2015, and entitled "Portable Countermeasure Device Against Unmanned Systems," all of which are incorporated by reference as if the same were set forth herein in their entireties.

TECHNICAL FIELD

The present disclosure relates generally to identifying, tracking, and managing unmanned aerial vehicles using a plurality of sensors, computer hardware, and computer software.

BACKGROUND

Unmanned Aerial Vehicles (UAVs), often referred to as "drones", are generally aircrafts operated without the presence of a pilot on board. UAVs vary in size and may be controlled in real-time from a remote location, or configured to operate autonomously. The introduction and growing popularity of UAVs in the airspace has raised issues regarding government regulations and the allowable usage of UAVs.

The anonymous nature of UAVs has introduced problems in areas where accountability and identity are of the utmost importance. Locations such as airports, prisons, sporting venues, residential homes, etc., are among these areas that require a safe and regulated airspace around their perimeters, and UAVs compromise the ability to ensure the safety of such airspaces. However, not all UAVs are flown with malicious intent and the use of UAVs to perform various tasks such as delivering consumer goods may become more acceptable as regulations change. Therefore, there is a long-felt but unresolved need for a system, method, apparatus, and/or device that is designed to detect, identify, track, and monitor UAVs in order to better protect airspaces and the areas they surround as well as monitor appropriate UAV operations.

BRIEF SUMMARY OF THE DISCLOSURE

Briefly described, and according to one embodiment, aspects of the present disclosure relate generally to systems, methods, apparatuses, and devices for identifying, tracking, and managing unmanned aerial vehicles (UAVs) using a plurality of sensors, hardware, and software. In one embodiment, and in accordance with aspects of the present disclosure, a plurality of sensors including at least video, audio, Wi-Fi, and radio frequency (RF) sensors, collect data from their surrounding environment in order to detect, identify, track, and manage UAVs.

In one embodiment, the video sensor is configured to "see" any approaching objects. In various embodiments, the video sensor records high definition video and can detect objects approaching from 100 meters away (or other predetermined distances based on technical specifications of the video sensor). According to various aspects of the present disclosure, the audio sensor is configured to "listen" to noise and various frequencies and/or frequency ranges that may be emitted from UAVs. In various embodiments, the Wi-Fi sensor included in the plurality of sensors is configured to detect Wi-Fi signals, and more particularly detect information transmitted within Wi-Fi signals such as SSID's, MAC addresses, and other information. In one embodiment, the RF sensor is configured to monitor frequencies spanning the frequency range of 1 MHz to 6 GHz; however, the RF sensor may be configurable beyond this range in certain embodiments. In some embodiments, included in the RF sensor is at least one software-defined radio (SDR) which allows the RF sensor to be dynamically configurable to monitor any RF frequency and/or range within the radio frequency spectrum.

In various embodiments, the systems, methods, apparatuses, and devices described herein collect and process large amounts of sensor information which may allow for the system to not only identify and track UAVs but also manage a recognizable catalog of UAVs that the system "knows" and monitors.

In certain embodiments, each sensor may collect its respective data and process the data locally within the circuitry of the sensor. In other embodiments, the sensors merely collect the data and forward the data to a central server which then processes the data.

Furthermore, in particular embodiments, the systems, methods, apparatuses, and devices described herein include one or more portable countermeasure devices. In various embodiments, the portable countermeasure devices include a body, at least one grip, at least one directional antenna coupled to a front of the body, a processor, and a memory operatively connected to the processor. In certain embodiments, the portable countermeasure device may be remote from the system control center. According to various aspects of the present disclosure, the system may detect UAVs via the various sensors, and furthermore may transmit an indication of the detected UAVs to the portable countermeasure devices. In at least one embodiment, the indication of the detected UAVs may include the UAV location coordinates (or position estimates), UAV communication signal information, etc. The portable countermeasure device may then generate a signal or waveform and directly transmit the waveform at the UAV for disrupting the UAV.

In various embodiments, present methods comprising receiving, via at least one computing device, sensor data relating to an object detected proximate to a particular airspace from a plurality of sensors; analyzing, via the at least one computing device, the sensor data relating to the object to determine a location of the object; determining, via the at least one computing device, that the object is flying within the particular airspace based at least in part on the location; identifying, via the at least one computing device, at least one portable countermeasure device based at least in part on the location of the object; transmitting, via the at least one computing device, information about the object to the at least one portable countermeasure device; and receiving, via the at least one computing device, additional data relating to the object from the portable countermeasure device.

In another aspect of the methods, the additional data is received as a data stream over a communication network from the at least one portable countermeasure device. In another aspect of the present methods, the particular airspace is proximate to at least one of the plurality of sensors. In another aspect of the present methods, the plurality of sensors comprises one or more of: a video sensor, a radio frequency ("RF") sensor, an audio sensor, and a radar sensor.

In another aspect of the present methods, identifying the at least one portable countermeasure device comprises: comparing, via the at least one computing device, the location of the object to one or more stored locations relating to a plurality of portable countermeasure devices, wherein the location of the object is determined to be within a predetermined distance threshold of the one or more stored locations; and determining, via the at least one computing device, the at least one portable countermeasure device that is within the predetermined distance threshold from the location of the object.

In another aspect of the present methods, the information about the object comprises at least a portion of the sensor data relating to the object from the plurality of sensors. In another aspect of the present methods, the information about the object is selected to enable the at least one portable countermeasure device to locate the object.

In another aspect, the present methods for locating an unmanned aerial vehicle ("UAV") in a particular airspace comprise receiving, at a processor in communication with a portable countermeasure device, UAV data from a UAV tracking system wherein the UAV data comprises information relating to a first location of a UAV in the particular airspace; determining, via the processor, a second location of the portable countermeasure device; analyzing the UAV data and the second location to determine relational data comprising a directional vector from the second location to the first location; and rendering, via the processor, an indication of the first location based at least in part on the directional vector.

In another aspect of the present methods, rendering the indication of the first location comprises at least one of: displaying a visual indicator on a display device, outputting an auditory indicator of direction from a speaker, and adjusting a direction of a motorized antenna.

In another aspect, the present methods include determining, via at least one sensor of the portable countermeasure device, an orientation of the portable countermeasure device, wherein the relational data is determined based at least in part on the orientation of the portable countermeasure device. In another aspect of the present methods, the directional vector is from a front-facing direction at the second location according to the orientation of the portable countermeasure device. In another aspect, the present methods include transmitting, via the processor and to the UAV tracking system, real-time information relating to the UAV from at least one sensor of the portable countermeasure device.

In another aspect, the present methods include generating, via the processor, a countermeasure waveform based at least in part on the UAV data received from the UAV tracking system and/or information detected directly from the UAV. In another aspect, the present methods include transmitting the countermeasure waveform towards the UAV in the particular airspace via at least one directional antenna of the portable countermeasure device. In another aspect of the present methods, the portable countermeasure device is operatively connected over a bilateral communication link with the UAV tracking system. In another aspect of the present methods, the bilateral communication link supports cellular communications. In another aspect of the present methods, the portable countermeasure device is operatively connected to an electronic communications receiver and transmitter.

In various embodiments, present systems for identifying unmanned aerial vehicles (UAVs) in a particular airspace, comprising: a video sensor proximate to the particular airspace, wherein the video sensor is configured to collect and transmit video data, the video data including at least one image of an object that may be a UAV flying within the particular airspace; an audio sensor proximate to the particular airspace, wherein the audio sensor is configured to collect and transmit audio signal data; a radio frequency (RF) sensor proximate to the particular airspace, wherein the RF sensor is configured to collect RF signal data; one or more portable countermeasure devices, each comprising a respective processor and a respective memory in communication therewith; and at least one computing device operatively coupled to the video sensor, the audio sensor, the RF sensor, and the one or more portable countermeasure devices, wherein the at least one computing device is configured to: analyze the video data, the audio signal data, and the RF signal data to determine a confidence measure that the object in the at least one image comprises a UAV; analyze the video data, the audio signal data, and the RF signal data to determine a location of the object in the particular airspace; in response to the confidence measure exceeding a predetermined threshold, determine at least one portable countermeasure device within a predetermined distance threshold from the location of the object; and transmit information about the object to the at least one portable countermeasure device.

In another aspect of the present systems, the audio signal data comprises frequency data indicating a possible presence of a UAV within the particular airspace and the RF signal data comprises data indicating the possible presence of a UAV within the particular airspace.

In another aspect, the present systems include a radar sensor proximate to the particular airspace, wherein the radar is configured to collect radar signal data, and the at least one computing device is further configured to determine the confidence measure and the location of the object based in part on the radar signal data. In another aspect of the present systems, the information about the object comprises at least one of the video data, the audio signal data, and/or the RF signal data. In another aspect of the present systems, the one or more portable countermeasure devices further comprise at least one signal disruption component.

In another aspect of the present systems, the at least one signal disruption component comprises at least one signal generator and at least one amplifier coupled to the at least one signal generator, wherein the at least one signal generator is configured to generate a disruptive signal on an associated frequency band and the at least one amplifier is configured to amplify the disruptive signal, wherein an amplified disruptive signal is transmitted by at least one antenna. In another aspect of the present systems, the respective processor of the one or more portable countermeasure devices is configured to attenuate an output power of a disruptive signal. In another aspect of the present systems, the respective processor of the one or more portable countermeasure devices is configured to attenuate the output power of the disruptive signal by at least one of: pulse width modulation, voltage control of an amplifier, a variable voltage attenuator, and waveform control.

In another aspect, the present handheld, man-portable countermeasure devices comprise at least one directional antenna; at least one signal disruption component in electronic communication with the at least one directional antenna, the at least one signal disruption component comprising at least one signal generator and at least one amplifier coupled to the at least one signal generator; at least one bilateral communication link via at least one computing device; a hand-held form factor body; and an activator communicatively coupled to the at least one signal disruption component.

In another aspect of the present devices, the countermeasure device is operatively connected with a UAV tracking system via the at least one bilateral communication. In another aspect of the present devices, the bilateral communication link supports cellular communications. In another aspect of the present devices, the portable countermeasure device is operatively connected to an electronic communications receiver and transmitter.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is an exemplary operational environment, according to one embodiment of the present disclosure.

FIG. 2 is an exemplary portrayal of ranges of a plurality of sensors, according to one embodiment of the present disclosure.

FIG. 3 illustrates a top plan view of a structure with a plurality of deployed sensors covering a range around the structure, according to one embodiment of the present disclosure.

FIG. 4 illustrates exemplary system architecture, according to one embodiment of the present disclosure.

FIG. 5A is an exemplary sensor device, according to one embodiment of the present disclosure.

FIG. 5B is an exemplary RF sensor device, according to one embodiment of the present disclosure.

FIG. 6 is a diagram of an exemplary portable countermeasure device, according to one embodiment of the present disclosure.

FIG. 7 is a diagram of an exemplary portable countermeasure device communication link, according to one embodiment of the present disclosure.

FIG. 8 is a flowchart of an exemplary portable countermeasure device selection process, according to one embodiment of the present disclosure.

FIG. 9 is a flowchart of an exemplary portable countermeasure device transmission process, according to one embodiment of the present disclosure.

DETAILED DESCRIPTION OF FIGURES

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

One embodiment of the present disclosure generally relates to systems, methods, apparatuses, and devices configured to identify, track, and manage UAVs. These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

Briefly described, and according to one embodiment, aspects of the present disclosure relate generally to systems, methods, apparatuses, and devices for identifying, tracking, and managing unmanned aerial vehicles (UAVs) using a plurality of sensors, hardware, and software. In one embodiment, and in accordance with aspects of the present disclosure, a plurality of sensors including at least video, audio, Wi-Fi, and radio frequency (RF) sensors, collect data from their surrounding environment in order to detect, identify, track, and manage UAVs.

In one embodiment, the video sensor is configured to "see" any approaching objects. In various embodiments, the video sensor can record high definition video and can detect objects approaching from 100 meters away (or other predetermined distances based on technical specifications of the video sensor). According to various aspects of the present disclosure, the audio sensor is configured to "listen" to noise and various frequencies and/or frequency ranges that may be emitted from UAVs. In various embodiments, the Wi-Fi sensor included in the plurality of sensors is configured to detect Wi-Fi signals, and more particularly detect information transmitted within Wi-Fi signals such as SSID's, MAC addresses, and other information. In one embodiment, the RF sensor is configured to monitor frequencies spanning the frequency range of 1 MHz to 6 GHz; however, the RF sensor may be configurable beyond this range in certain embodiments. In some embodiments, included in the RF sensor is at least one software-defined radio (SDR) which allows the RF sensor to be dynamically configurable to monitor any RF frequency and/or range within the radio frequency spectrum.

In various embodiments, the systems, methods, apparatuses, and devices described herein collect and process large amounts of sensor information which may allow for the system to not only identify and track UAVs, but also manage a recognizable catalog of UAVs that the system "knows" and monitors.

In certain embodiments, each sensor may collect its respective data and process the data locally within the circuitry of the sensor. In other embodiments, the sensors merely collect the data and forward the data to a central server which then processes the data.

Referring now to the figures, for the purposes of example and explanation of the fundamental processes and components of the disclosed systems, methods, apparatuses, and devices, reference is made to FIG. 1, which illustrates an exemplary, high-level overview of one embodiment of an operational environment 100 in accordance with various aspects of the present disclosure. As will be understood and appreciated, the conceptual overview shown in FIG. 1 represents merely one approach or embodiment of the present system, and other aspects are used according to various embodiments of the present system.

In one embodiment, the exemplary operational environment 100 includes at least an Unmanned Aerial Vehicle Tracking and Monitoring System (UAVTMS) 102 and a plurality of installation locations 110A, 110B, and 110C. In various embodiments, the UAVTMS 102 is a central system combined with a plurality of sensors and other computer hardware and software operating to identify, track, and manage UAVs. According to various aspects of the present disclosure, the UAVTMS 102 may be referred to herein as the central system or the central system and sensors. In particular embodiments, the central system is configured to accept, collect, and aggregate data from the plurality of sensors indicated throughout as element 112, as well as various computing devices, databases, portable countermeasure devices, and other external sources of electronic data. The UAVTMS 102 may be further configured to process the various sensor readings and other data through a series of algorithms and computer-implemented processes to identify, track, and manage UAVs. In general, all information from the installation locations may be directed to the central system of the UAVTMS 102 for processing and in some embodiments, the UAVTMS 102 may convert the information from the external environments into meaningful data that can be used to further identify, track, and disrupt UAVs.

The disclosed systems, methods, apparatuses, and devices may be desirable in many situations and scenarios. For example, buildings and structures such as government buildings, prisons, universities, airports, sporting venues, personal homes, etc., require a safe and monitored airspace as well as the surrounding area. The UAVTMS 102 disclosed herein may allow a plurality of sensors and portable countermeasure devices to monitor the airspace and general area surrounding buildings and structures, such as the buildings and structures mentioned above. Further, as UAVs continue to become more popular and acceptable in society, it may be desirable to be able to distinguish malicious UAVs (UAVs for spying, trespassing, etc.) from benign UAVs (UAVs for delivering consumer goods, etc.). In one embodiment, the UAVTMS 102 disclosed herein may be configured to monitor particular UAVs and store information regarding particular malicious and benign UAVs in order to better identify, monitor, and manage their presence in an airspace (such as by emitting disruptive signals to prevent the presence in unauthorized airspace).

In some embodiments, the UAVTMS 102 may include at least a management module 104 and a database 106. As will be described in further detail in FIG. 4, the management module 104 may execute the computer-implemented methods of processing data inputs and outputs, as well as analyzing whether or not an object is a UAV and further determine if it should be tracked, monitored, or otherwise responded to in another appropriate manner. The management module 104 may include hardware components such as a processor, computer-executable instructions, a non-transitory computer-readable medium wherein the computer-executable instructions may be stored, etc. In the present embodiment, the management module 104 may share a bi-directional communication link with a database 106 which may allow for the two elements to send and receive data across the communication link as necessary. The database 106 included in the UAVTMS 102 may store any information pertaining to the processes performed by the management module 104. Examples of this information may include but are not limited to images of previously identified UAVs, audio files including data representing sound patterns of UAVs, information about objects that resemble UAVs but should not be mistaken for one, etc. According to various aspects of the present disclosure, the central system of the UAVTMS 102 may include modules such as the management module 104. Also, the management module 104 may include various servers, databases, and other computing hardware located either in a remote or central location. In one embodiment, the central system may operate as a cloud computing system. In other embodiments, the central system may be physically located in close proximity to the installation locations.

Continuing with FIG. 1 and as mentioned above, in some embodiments the UAVTMS 102 may be deployed at a plurality of installation locations, indicated throughout as 110A-110C, through networks 108. The networks 108 may be, but are not limited to the Internet, and may involve the usage of one or more services (e.g., a Web-deployed service with client/service architecture, a corporate Local Area Network (LAN) or Wide Area Network (WAN), a cellular data network, or through a cloud-based system). Moreover, as will be understood and appreciated by one having ordinary skill in the art, various networking components like routers, switches, hubs, etc. are typically involved in these communications. Although not shown in FIG. 1, such communications may include, in various embodiments, one or more secure networks, gateways, or firewalls that provide additional security from unwarranted intrusions by unauthorized third parties and cyber-attacks.

As shown in the present embodiment, examples of installation locations may include airports 110A, prisons 110B, and residential homes 110C, whereby the installation locations 110A-110C may send and receive data over networks 108 to the central system of the UAVTMS 102. In some embodiments, the installation locations 110A-110C may provide the majority of data accepted by the UAVTMS 102. It should be understood by the discussion herein that the present disclosure should not be limited to the installation locations described.

According to aspects of the present disclosure, the installation locations such as airports 110A, prisons 110B, residential homes 110C, or other structures and buildings may include a plurality of sensors 112A-112C deployed on the structure or building that communicate with the central server of the UAVTMS 102 over a network 108. In some embodiments, the plurality of sensors may communicate the sensor readings, over the network 108, to the UAVTMS 102 to be processed. In other embodiments, the sensor readings may be processed locally before being sent to the UAVTMS 102. In an example scenario, a UAV may be approaching a fenced enclosure adjacent to a prison 110B. This scenario may present a risk to the prison 110B, because the UAV may be carrying a payload that could be dangerous if it were to be delivered to a prison inmate. The plurality of sensors 112B deployed on the prison 110B may identify and track the UAV before it has the opportunity to drop the payload onto prison grounds or present a risk in another situation. In one embodiment, the UAVTMS 102 may identify and track the approaching UAV and alarm the prison guards to escort any inmates back into the prison 110B. In another embodiment, the prison 110B may exercise forceful action against the UAV, which may include overtaking the UAV's control system or disabling the UAV's ability to remain airborne. In other embodiments, the central system of the UAVTMS 102 operating at the prison 110B may simply track the UAV, and manage the UAV's identity within the central system of the UAVTMS in order to more easily recognize the UAV if it were to re-appear in the future.

In various embodiments, the sensors included in the plurality of sensors 112A-112C may be proprietary sensors or commercially available sensors. In some embodiments, the sensors 112 may be part of a portable countermeasure device as described herein. In particular embodiments, the video sensor included in the plurality of sensors 112A-112C is similar to the Lensation GmbH Lensagon B10M5425. In one embodiment, the video sensor has a dome-shaped configuration and is capable of recording 1080p resolution video within a wide-angle field of view. According to various aspects of the present disclosure, the video sensor is configured to record activity within a field of view that a UAV would be expected to enter. For example, the video sensor may be pointed upward at the sky in anticipation of a UAV approaching from a high altitude. In some embodiments, a pre-installed stand-alone video sensor, such as pre-existing home/location security equipment, can be included in the plurality of sensors 112A-112C.

In various embodiments, the audio sensor may be a proprietary waterproof audio sensor designed to receive, amplify, and convert sound from audible vibrations to digital representations of a signal by implementing an analog to digital converter. According to various aspects of the present disclosure, the audio sensor may be capable of 24-bit sampling at various rates, such as 192 kHz.

In one embodiment, the Wi-Fi sensor may operate similarly to the Intel Corporation Dual Band Wireless-AC 3160 Wi-Fi card. In various embodiments, the Wi-Fi sensor is configured to detect wireless signals and more particularly Wi-Fi signals transmitting information such as Service Set Identifiers (SSID), Media Access Control (MAC) addresses, Received Signal Strength Indicators (RSSI), and other information regarding potential UAVs.

In various embodiments, the RF sensor may operate similarly to the Great Scott Gadgets HackRF One sensors. In various embodiments, the RF sensor is configurable to operate within the 1 MHz to 6 GHz frequency range. In particular embodiments, the RF sensor may be configured to operate within any appropriate frequency range as defined by the particular hardware and software in operating on the device.

In one embodiment, a user 118 operates a computing device connected to the central system of the UAVTMS 102 over the network 108. According to various aspects of the present disclosure, the user 118 may be a moderator or manager of a particular installation location 110A-110C. In some embodiments, the user 118 may be able to interact with or monitor the plurality of sensors 112A-112C at the installation locations 110A-110C. In an example scenario, a user may have a plurality of sensors 112C deployed on his/her home 110C and would like to monitor his/her surrounding property while away. Using a computing device such as a mobile phone, the user 118 could access the information regarding the plurality of sensors 112C deployed on his/her home 110C by logging into the central system of the UAVTMS 102 and accessing a control panel or dashboard. In various embodiments, accessing the control panel or dashboard allows for the user 118 to manage the plurality of sensors 112C at the installation location 110C as well as view real-time feeds from the video sensor, historical data from previous UAVs or non-UAVs that were detected by the central system and sensors 202, current maps representing particular sensor ranges, individual sensor diagnostics, and other relevant information regarding the identifying, tracking, monitoring, and managing of UAVs. In particular embodiments, there may be multiple deployments of a plurality of sensors 112C on the installation location 110C. The user 118 may manage multiple deployments of sensors 112C on one installation location 110C from the portal or dashboard. Also, the user 118 may manage multiple installation locations 110C from the portal or dashboard.

In some embodiments, the user 118 may use a computing device in order to access a web server or web application that may allow access to the central system of the UAVTMS 102. It should be understood from the discussion herein that any type of computing device such as a tablet, laptop computer, desktop computer, mobile phone, etc., could be used to access the central system of the UAVTMS 102 and the present disclosure should not be limited to the use of just a mobile phone.

In one embodiment, third party databases and data sources 120 are connected to the central system of the UAVTMS 102 over a network 108. These third-party databases 120 may include a plurality of different datasets and sources of information pertinent to identifying and tracking UAVs, or maintaining a system as described in the present disclosure. As necessary, the central system of the UAVTMS 102 may write and read data to and from the third party databases 120. In various embodiments, it may be beneficial for the central system of the UAVTMS 102 to access information regarding UAV manufacturers and specifications in a third party database 120 in order to cross-reference and verify the data collected by the plurality of sensors 112A-112C with the manufacturer's information. In a scenario where a UAV is approaching an airport 110A and the airport 110A has deployed a plurality of sensors 112A such as those described herein, the plurality of sensors 112A may be able to read signals from the approaching UAV and compare them to signals known to be emitted from certain UAVs of particular manufacturers. In other embodiments, the plurality of sensors 112A may transmit the detected signals to the central system of the UAVTMS 102 in order to compare the signals to other signals known to be emitted from certain UAVs of particular manufacturers. That information may allow the airport 110A to make an informed decision regarding how to respond to the approaching UAV. In some embodiments, information similar to the information available from third party databases 120 may already be stored in a database 106 included in the UAVTMS 102. However, including access to third-party databases 120 may allow for the UAVTMS 102, as well as all parts of the disclosed system, to have access to the most recent information available in real-time.

In the present embodiment, a third-party database 120 is shown including relevant data and information 122 corresponding to but not limited to UAV updates, regulations, manufacturer specifications, and other general information. In one embodiment, this relevant data and information 122 may allow for the central system of the UAVTMS 102 to have access to data that may determine how the system may respond to UAVs. For example, the Federal Aviation Administration (FAA) may release new regulations regarding how UAVs may be operated in certain areas. This information may then automatically be updated in the third party database 120. This updated information may change how the system responds to a detected UAV flying at a certain height if operating a UAV at that height is made illegal based on new regulations.

In various embodiments, the relevant data and information 122 may include information pertaining to particular UAVs such as MAC addresses, particular communication frequencies, noise patterns, and other manufacturer-specific information regarding UAVs. By accessing the data and information 122 included in the third party database 120, the central system of the UAVTMS 102 may be able to more consistently and accurately identify, track, monitor, and manage UAVs.

Still referring to FIG. 1, in one embodiment, the plurality of sensors 112A-112C may be combined into one all-encompassing device. Devices such as those shown in FIGS. 5A and 5B may include the plurality of sensors 112A-112C described in the discussion herein. According to various aspects of the present disclosure, the plurality of sensors 112A-112C may be a single sensor or many sensors enclosed in either one more multiple devices. Now referring back to FIG. 1, a device 112A may be installed on the air traffic control tower of the airport 110A in the present embodiment. In one embodiment, a device range 114A, represented as dotted lines and propagating from the device 112A, indicates the range that the device 112A may be able to detect UAVs within. In various embodiments, having a plurality of sensors included in one device may allow the ranges of each sensor to originate from the same location. In some embodiments, it may be beneficial to have a plurality of sensors included in one device and other sensors as stand-alone sensors if a particular area needs specific or customized coverage. In particular embodiments, the airport 110A may require multiple devices 112A in order to sufficiently cover a desired area or range. According to various aspects of the present disclosure, any appropriate sensor may be included in the device 112A, and the present disclosure should not be limited to the sensors listed and described.

In the present embodiment and continuing with the airport 110A external environment, a UAV 116A is shown within the dotted lines representing the device range 114A. According to aspects of the present disclosure, the UAV 116A may be detectable by one or more sensors included within the device 112A when the UAV 116A enters the device range 114A. Once within the device range 114A, the device 112A may transmit information regarding the UAV 116A to the central system of the UAVTMS 102 for processing. In certain embodiments, the device 112A may process the sensor readings locally. Once the information regarding the UAV 116A is processed by the UAVTMS 102, the UAVTMS 102 may then decide how to respond to the UAV 116A. Also in the present embodiment is an airplane 118A flying near the airport 110A. In one embodiment, the airplane 118A may enter a device range 114A. Similarly to when the UAV 116A enters the device range 114A, when the airplane 118A enters the device range 114A the device 112A may transmit information regarding the airplane 118A to the central system of the UAVTMS 102 for processing, or the processing may occur locally at the device 112A. As will be discussed in greater detail herein, when the UAV 116A and the airplane 118A are detected within the device range 114A, the central system and sensors, in general, do not know or have not confirmed the identity of these objects, but the UAVTMS 102 can quickly identify each object as a UAV or non-UAV by implementing the various systems and methods described in the present disclosure.

Continuing with FIG. 1 and according to aspects of the present disclosure, the devices 112A-112C can be used in many environments and installation locations in addition to those discussed herein. In various embodiments, devices such as 112A-112C may be deployed at locations such as hospitals, office buildings, universities, sporting venues, etc. In particular embodiments, the system may also include a portable countermeasure device not deployed at any particular location, but the portable countermeasure device may be mobile for being transported by an individual, installed onto/into an automobile, installed onto/into an aircraft, etc. In at least one embodiment, the portable countermeasure device may be configured into various form factors, such as a firearm form factor (e.g., a rifle, a shotgun, etc.). According to various aspects of the present disclosure, the portable countermeasure device may be operatively connected to the UAVTMS 102 via a communication link (e.g., a wireless network connection). In various embodiments, the UAVTMS 102 may transmit indications of detected UAVs to the portable countermeasure device over the communication link, and the portable countermeasure device may transmit indications of detected UAVs to the UAVTMS 102. Accordingly, the UAVTMS 102 may be alerted of UAVs detected by the portable countermeasure device at locations remote from the UAVTMS 102, and the various system sensors may then be instructed to focus on the location of the detected UAV for receiving additional information (e.g., video, audio, communication signals, etc.) relating to the detected UAV.

Turning now to FIG. 2, an exemplary portrayal 200 of sensor ranges around a location (e.g., an airport 110A) is shown according to one embodiment of the present disclosure. In the present embodiment, an RF sensor range 202A, video sensor range 202B, Wi-Fi sensor range 202C, and an audio sensor range 202D surround the airport 110A and may be propagated from a device 112A including the sensors. In the present embodiment, the device 112A is shown included on the air traffic control tower, but it should be understood from the discussion herein that the device 112A, or many devices 112A, may be deployed anywhere in or around the airport 110A. As will be described further below in the detailed description of FIG. 2, combining data from a plurality of sensors allows for the UAVTMS 102 to quickly identify a UAV in an area that may contain various non-UAV objects such as birds and planes that may trigger typical aerial monitoring devices.

In an environment such as the one shown in the present embodiment, it may be important to monitor and control the surrounding airspace. A situation may arise where a UAV is flying near the airport 110A runway and may strike an airplane, potentially causing damage to the airplane and risking the lives of the passengers. Another situation may arise where a particular military aircraft is intended to remain concealed within the confines of the airport 110A, and a UAV equipped with a camera may recognize the aircraft, resulting in a national security threat. In one embodiment, the RF, video, Wi-Fi, and audio sensors may all be configured to monitor their surroundings and prevent the above scenarios. For example, in the present embodiment, a UAV 204A has entered the RF sensor range 202A, and therefore the UAV 204A may be detectable by the RF sensor. Also in the present embodiment, a UAV 204C has entered the RF sensor range 202A, video sensor range 202B, and the Wi-Fi sensor range 202C Wi-Fi, and therefore the UAV 204C may be detectable by each of those three sensors. In particular embodiments, if an object is detectable by multiple sensors, it may allow for the UAVTMS 102 to determine if it is a UAV faster than if the object was only detected by one sensor. According to various aspects of the present disclosure, each sensor is capable of monitoring the airspace between the sensor and its farthest extendable range.

In various embodiments, not all types of sensors are capable of extending equivalent ranges. According to aspects of the present disclosure, the ranges of the plurality of sensors may overlap until each sensor has reached its maximum range. For example, in the present embodiment, only the RF sensor is capable of detecting UAVs at its outermost RF sensor range 202A, and all deployed sensors are capable of detecting UAVs at the audio sensor's outermost range 202D. In particular embodiments, overlapping sensor ranges may allow for the central system and sensors 202 to better identify and determine a UAV from a non-UAV such as a plane or a bird. However, according to various aspects of the present disclosure, the sensor ranges 202A-202D are not required to overlap, and some areas may be better monitored by using one particular sensor. In various embodiments, the described sensor ranges 202A-202D may vary from the current embodiment. For example, it is possible that the audio sensor range 202D may extend farther than the Wi-Fi sensor range 202C based on configuration, hardware specifications, etc. Also, in one embodiment the video sensor may be configured to accept different lenses. Allowing the video sensor to accept different lenses may allow for the video sensor to record a larger field of view, record with increased clarity/resolution at farther distances, etc. In particular embodiments, certain sensor configurations allow for a wide spherical or dome-like range, while other sensor configurations monitor a more directed field of view. The present embodiment is only one configuration of sensor ranges and it should be understood from the discussion herein that there may be many configurations of different sensors and sensor ranges, and the examples shown herein are exemplary and for the purpose of discussion only.

FIG. 3 is a top plan view 300 of multiple buildings or structures at the prison installation location 110B with a plurality of devices 112B deployed thereon. In the present embodiment, the range 114B and direction of the sensor coverage is indicated by dashed lines propagating from the devices 112B. In one embodiment, this range 114B and direction may represent the area around a building or structure at the installation location 110B in which a UAV would be detectable. In some embodiments, each device 112B may be installed at certain angles and configurations in order to monitor a range 114B or a particular field of view or area. In particular embodiments, devices 112B are configured to monitor certain ranges 114B by taking into account vulnerable areas such as large open spaces around the installation location 110B, and other factors such as particular shapes and sizes of buildings in order to ensure that unnecessary amounts of coverage are not directed at locations that require less coverage, etc. According to the present embodiment, each device 112B may have a general range 114B, indicated by the dotted lines propagating from the devices 112B, wherein if a UAV were to enter then that UAV would be detectable. As mentioned previously in FIG. 2, each device 112B may be configured to include different sensors and different ranges 114B. This is shown, according to one embodiment, by the various device ranges 114B shown in the present embodiment. In various embodiments, one device range 114B may be twice as large as another device range 114B due to either particular configurations, the number of sensors included in the device 112B, the quality and specifications of the particular sensors included, etc. These devices 112B may have been configured to monitor particular areas surrounding the structures 110B in such a way that the area of coverage of all ranges 114B may be maximized. In various embodiments, by strategically choosing the location of installation for each device 112B, the coverage range may be optimized. According to various aspects of the present disclosure, the device ranges 114B may overlap and are not limited to a configuration of ranges such as the ranges shown in the present embodiment.

Referring now to FIG. 4, an exemplary system architecture 400 is shown, according to one aspect of the present disclosure. In the present embodiment, the central system and sensors of the UAVTMS 102 are illustrated sharing a connection over a network 108. In greater detail, the sensors of the UAVTMS 102 are represented as individual devices 402A-402n including various numbers of sensors. As previously described in FIG. 1, a plurality of sensors (e.g., Wi-Fi, video, audio, RF, etc.) may be combined into an all-encompassing device 112, indicated in FIG. 4 as 402A-402n. The plurality of devices 402A-402n, each potentially configured to include a certain number of different sensors, may transmit sensor readings to the central system of the UAVTMS 102. In one embodiment, Device 1, indicated as 402A, includes three sensors labeled Sensor 1A, Sensor 1B, and Sensor 1C. It should be understood from the discussion herein that Device 1, indicated as 402A, may include various numbers of sensors of various types (e.g., Wi-Fi, audio, video, RF, etc.). Device 2, indicated as 402B, includes four sensors labeled Sensor 2A, Sensor 2B, Sensor 2C, and Sensor 2D. Device 1, indicated as 402A, may be substantially similar to Device 2, indicated as 402B, minus the one sensor that the two devices may not have in common, as shown in the present embodiment. In the present embodiment, a representation of additional devices, Device "n", is included and indicated as 402n. In some embodiments, as many devices as necessary or appropriate may be connected to the central system of the UAVTMS 102 over the network 108. In particular embodiments, the devices 402A-402n are installed at a plurality of locations which may be remote from or local to the central system of the UAVTMS 102. In certain embodiments, the devices remote from the central system of the UAVTMS 102 may include handheld/portable countermeasure devices. According to various aspects of the present disclosure, the handheld countermeasure devices may be equipped with various sensor types for detecting UAVs in a surrounding airspace. Furthermore, the handheld countermeasure devices may also be configured to generate one or more waveforms that may be transmitted at a UAV for mitigating the UAV risk (e.g., jamming the UAV, instructing the UAV to land, disrupting stable UAV operations, etc.).

Also operatively connected to the central system of the UAVTMS 102 may be a plurality of computing devices controlled by a user 118, such as mobile devices 418A, remote servers and systems 418B, and personal computers 418C, etc. As described in FIG. 1, the computing devices controlled a user 118 may be connected to the central system of the UAVTMS 102 over a network 108 and may be configured to control or monitor the UAVTMS 102 and various locations of the deployed system and sensors, or analyze the information stored within the central system of the UAVTMS 102 by accessing a dashboard or portal. In some embodiments, computing devices such as third party databases 120 are connected to the central system of the UAVTMS 102 and may be configured to operate autonomously.

Continuing with FIG. 4, an embodiment of the UAVTMS 102 is represented in greater detail than previously shown in FIG. 1. In the present embodiment, the central system of the UAVTMS 102 includes the management module 104, a Drone/UAV DNA database 412, a system management database 414, and a web server 416 to be described below. In one embodiment, the management module 104 may be configured to intake the sensor information from the devices 402A-402n as transmitted over the network 108, then process and analyze the information in order to determine how to respond to a detected UAV. In various embodiments, the sensor information from devices 402A-402n may be processed locally at each device and then only certain results or values may be transmitted over the network 108 to the management module 104. In particular embodiments, the central system of the UAVTMS 102 may be local to the devices 402A-402n. In these particular embodiments, the processing of the sensor information would be performed locally which may eliminate the need to transmit information. In some embodiments, the data from the devices 402A-402n may be transmitted to the configuration module 404 represented in the management module 104. According to aspects of the present disclosure, the configuration module 404 may include the processes that interpret and analyze the data from the devices 402A-402n in order to determine if a UAV is present. The data may then be further transmitted to the module labeled aggregation 406. In various embodiments, the aggregation module 406 may include processes that combine the results and values, such as confidence levels, from the configuration module 404 in order to determine if a UAV is detected. In the present embodiment, the two modules below the aggregation module 406 are labeled as "actions" 408 and "notifications" 410. In various embodiments, these two modules may represent the processes that determine if a UAV has been identified and how to respond accordingly. For example, processes operating within the aggregation module 406 may combine various confidence levels regarding UAV likelihoods and determine that a UAV is present in a particular area. Further, the processes operating within the actions module 408 may determine that the UAV is an unrecognized UAV and a system moderator should be alerted. Continuing with the example, the processes operating within the actions module 408 may forward the information regarding the identified UAV to the notifications module 410 which may then send an alert regarding the UAV to a user 118 of a user device.

In some scenarios, a particular sensor, such as a Wi-Fi sensor included in the UAVTMS 102, may detect a UAV with 100% (or near 100%) confidence. In this scenario, the configuration module 404 may transmit the information regarding the detected UAV directly to the actions 408 or notifications 410 modules without first transmitting information to the aggregation module 406 because the UAVTMS 102 has already established a 100% (or near 100%) confidence and no further processing is required.

Included in the management module 104 and also connected to by a bi-directional data path are the Drone/UAV DNA database 412 and system management database 414. These databases may include information pertaining to the systems and methods performed within the management module 104. The Drone/UAV DNA database 412 may include information that allows the disclosed system to better identify and track UAVs. In one embodiment, the Drone/UAV DNA database 412 may include meta-information regarding UAVs either compiled over time by the UAVTMS 102 or made available by UAV manufacturers, government agencies, or other organizations. This meta-information may be typical UAV weights, capabilities, and other technical specifications known about particular UAVs. In some embodiments, if a new UAV is detected by the system, the meta-information may be automatically uploaded to the Drone/UAV DNA database 412 to include the new information corresponding to the newly detected UAV. Similarly to the Drone/UAV DNA database 412, in various embodiments the system management database 414 may include information regarding UAV alerts, configurations, or other information regarding general system diagnostics. In particular embodiments, the databases included in the central system of the UAVTMS 102 may include any appropriate information for UAV identification, tracking, and monitoring and should not be limited to the information discussed herein. According to various aspects of the present disclosure, the databases included in the UAVTMS 102 may be cloud-based, virtual, local, or any other appropriate form of computer memory.

Continuing with FIG. 4 and in one embodiment, the information stored in the databases 412 and 414, as well as the information processed by the management module 104 may be accessible through a web server 416. The web server 416 may include a bi-directional link between the management module 104, as well as bi-directional links between the at least one database included in the central system of the UAVTMS 102. The web server 416 may also include a bi-directional link and be operatively connected over the network 108 to the plurality of computing devices. In the present embodiment, the plurality of computing devices are indicated as 418A, 418B, and 418C. In the present embodiment, 418A, 418B, and 418C may connect directly to the web server 416 included within the UAVTMS 102. According to aspects of the present disclosure, the web server 416 may allow for the plurality of computing devices 418A, 418B, and 418C to access the data included in the UAVTMS 102. In certain embodiments, it may be useful for the computing devices 418A, 418B and 418C to have access to the web server 416 because the web server 416 may allow the information processed and stored within the UAVTMS 102 to be shared with the users 118 and monitors of the system. In one embodiment, the web server 416 may allow for the plurality of computing devices 418A, 418B, and 418C to access live feeds from sensors. Shown in the present embodiment, the web server 416 includes bi-directional links to all of the elements within the UAVTMS 102. In some embodiments, the web server 416 may handle the querying of information from the UAVTMS 102 and transmitting the queried information to the plurality of computing devices 418A, 418B, and 418C. However, it should be understood from the discussion herein that the computing devices shown in the present embodiment are not intended to limit the scope of the disclosure, rather they are intended to portray the various possible computing devices capable of communicating with the exemplary system.

As will be understood by one of ordinary skill in the art, the system, architectural components, and operative connections/communication pathways shown in these figures are intended to be exemplary only. In various embodiments, the architectural components of the systems and methods described herein may be distributed architectures (even though shown as a single component). In particular embodiments, the architectural components may be operatively connected in any suitable way.

According to one embodiment of the present disclosure, FIG. 5A is an exemplary sensor device 112, and FIG. 5B is an exemplary RF sensor device 510. Together, and in various embodiments, FIGS. 5A and 5B are exemplary hardware devices including the plurality of sensors, as described herein. In certain embodiments, a plurality of sensors may be included in one all-encompassing device, such as device 112, or various sensors can be standalone sensors, such as the RF sensor device 510. Although two examples of sensor devices are shown, in various embodiments it is possible to include all sensors in a single device.

Referring to FIG. 5A, a plurality of sensors are included in the device 112 shown. The device 112 as shown in the present embodiment includes an X-shape with a circular center but it should be understood from the discussion herein that the device 112, and the RF sensor device 510, may have any shape and are not limited to the shapes as shown on FIG. 5. According to certain aspects of the present disclosure, the arms protruding from the circular center of the device 112 may house the included sensors. In one embodiment, the arms may be detachable and interchangeable so as to configure the sensor device 112 with an optimal number of each sensor. In other embodiments, the device 112 may include more or less than four arms, or no arms, in order to allow for various configurations of sensors. In the present embodiment, a video sensor 502 may be the circular center of the device 112. According to aspects of the present disclosure, the video sensor 502 may allow for the device 112 to capture and maintain a video stream of a particular field of view, as determined during configuration. In various embodiments, the video sensor 502 may capture 1080p HD resolution video and may be configurable within a 60-120 degree field of view, but also many other fields of view depending on particular device configurations. In one embodiment the video sensor 502 may also be capable of near-infrared HD detection. Generally, the video sensor 502 allows for the device 112 to "see" the particular object in order to classify it as a UAV or non-UAV.

The arms indicated as 504 in the present embodiment may be audio sensors 504, according to aspects of the present disclosure. In certain embodiments, it may be desirable for a particular device to include more than one sensor for reasons such as adding range, accuracy, consistency, or overall better coverage around a particular monitored area when detecting UAVs. In the present embodiment, the device 112 includes two audio sensors 504. In various embodiments, the audio sensors 504 may be capable of detecting stereo audio, which includes audible sonic and ultrasonic frequencies, ranging between 0-96 kHz, but it should be understood from the discussion herein that the audio sensors 504 may be configured to monitor any appropriate frequency range. Generally, the audio sensor 504 allows for the device 112 to "hear" the particular object in order to classify it as a UAV or non-UAV.

Continuing with FIG. 5A, the device 112 as shown in the present embodiment includes at least one Wi-Fi sensor 506. In various embodiments, UAVs may be connected over Wi-Fi to a wireless local area network (WLAN). In one embodiment, including a Wi-Fi sensor 506 on the device 112 may allow for any UAV being controlled and/or being accessed over Wi-Fi to be detected.

It should be understood from the discussion herein that any type of appropriate sensor that could be useful in identifying, tracking, and managing UAVs may be included in the device 112, and this is indicated at device arm 508 labeled "other". In various embodiments, examples of these "other" sensors might include high-resolution thermal imaging sensors and radar sensors operating in the ISM-band (Ultra-Wide Band and mmWave-Radar) for detecting UAVs based on heat emissions or particular frequency ranges. In certain embodiments, PTZ-Cameras (EO and Thermal) may be included in order to increase the range of video-based identification and tracking of UAVs. In certain embodiments, device 112 and the attached sensor arms 502, 504, 506, and 508 may include on-device computing capabilities and computer memory/storage in order to perform the various processes and functions described herein relating to identifying, tracking, and managing UAVs.

Referring now to FIG. 5B, a single RF sensor device 510 is shown, according to one embodiment of the present disclosure. The RF sensor device 510 may be a standalone sensor, as shown in the present embodiment, or it may be included in the device 112. In one embodiment, the RF sensor may be capable of scanning various industrial, scientific, and medical (ISM) bands, as well as other frequency bands, and detecting signals therein. In certain embodiments, the RF sensor may continuously scan and detect 5 GHz video signals, or signals on any other appropriate carrier frequency and/or frequency range, and further decode the video signals. According to aspects of the present disclosure, some UAVs are equipped with video cameras and may transmit the video signals back to a base station or computing system to be viewed by the UAV operator/controller. In various embodiments, a base station may be a physical remote-control, a smartphone, a video-receiver, or a similar device. In one embodiment, these video signals transmitted from the UAV to a base station may provide information regarding the location of a UAV or the UAV controller, which may aid in the identifying and tracking of the UAV. In certain embodiments, the RF sensor device 510 is configured to detect these signals and extract any information from the signal regarding the presence of a UAV. In some embodiments, the range of an RF sensor such as the RF sensor device 510 may extend to about 500 meters; however, it should be understood from the discussion herein that the range of the RF sensor device 510 may vary according to various configurations. It should be understood that the various sensors described herein are exemplary, and any type of sensor that may be useful in identifying, tracking, and managing UAVs may be included in the present system.

Referring now to FIG. 6, there is shown a functional block diagram of the portable countermeasure device 600 in accordance with one exemplary embodiment of the subject application. As illustrated in FIG. 6, the portable countermeasure device 600 may be implemented in a firearm-like form factor or man-portable handheld form factor, providing ease of use and familiarization with the user. In some embodiments, the portable countermeasure device 600 can function as a mobile device 112 as described herein in addition to providing other functionality (such as emitting disruptive signals). Accordingly, the portable countermeasure device 600 provides a soldier or law enforcement officer with the ability to specifically target a particular drone/UAV with disruptive signals, while minimizing the impact of the generated signal on other, non-targeted devices. It will be appreciated that the various components depicted in FIG. 6 are for purposes of illustrating aspects of the exemplary hardware are capable of being substituted therein.

It will be appreciated that the portable countermeasure device 600 of FIG. 6 is capable of implementation in a variety of handheld or portable form factors, and the illustrations depicted and discussed hereinafter provide exemplary, and non-limiting, form factors contemplated hereunder. As shown in FIG. 6, the portable countermeasure device 600 comprises a body 602 including signal disruption components 604, e.g., at least one signal generator 606 and at least one amplifier 608. It will be appreciated that the body 602 may, for example and without limitation, resemble a commonly used rifle, including, without limitation, M4 carbine, M14, AR-platform, or the like, comprising an upper receiver and a lower receiver, as well as other rifle designs, as will be appreciated by those skilled in the art including, for example, modular rifle designs, standard rifle designs, and the like. Depending upon the configuration of the portable countermeasure device 600, the signal disruption components 604 may be contained in the upper receiver, the lower receiver, or both.

The body 602 may be constructed of non-metallic materials, i.e., ballistic plastic, carbon fiber, ceramics, etc., or suitable non-transmissive metallic composites. The body 602 may be implemented in a suitable form factor with which soldiers and/or law enforcement personnel are already familiar, e.g., the aforementioned M4 carbine, AR-platform, AK-platform, SCAR, bullpup, etc. It will be appreciated that the width, length, and height of the body 602 may be dependent upon the size and number of generators 606 and amplifiers 608 either integral therein or externally affixed thereto. According to one embodiment, a multifunctional cell is formed as the body 602 to provide both structural support/shape of the portable countermeasure device 600 as well as supply power to the components therein. A suitable example of such a multifunctional cell is provided in PCT/US2013/040149, filed May 8, 2013, and entitled MULTI-FUNCTIONAL CELL FOR STRUCTURAL APPLICATIONS, the entire disclosure of which is incorporated by reference herein. In accordance with another embodiment, the portable countermeasure device 600 may include multiple signal disruption components 604 to combat a variety of potential targets, e.g., receivers of improvised explosive devices (IEDs), commercial drones, military drones, or other portable electronic devices of enemy combatants or suspects, e.g., cellular phones, GPS/Satellite-based navigation devices, remote control detonators, etc.

The portable countermeasure device 600, as shown in FIG. 6, includes a first activator 610, and a second activator 612, which are located adjacent to a pistol grip 614 on the underside of the body 602. It will be understood that the portable countermeasure device 600 may be implemented with a single activator, whereby multiple disruptive signals are generated via the activation of the single activator. The activators 610-612, as will be appreciated, is operable to close a circuit or "firing mechanism" (not shown) to allow power to flow from the power source, e.g., backpack (not shown), AC power (not shown), or optional, the battery pack 616 (shown in dashed lines), to the signal generator 606 and amplifier 608 of the signal disruption components 604. It will be appreciated that the activators 610-612 may be implemented as typical firearm triggers, toggle switches, spring-loaded buttons, or the like. According to one embodiment, the first activator 610 is operable to activate control circuitry for disruption of control frequency bands, while the second activator 612 is operable to activate control circuitry for disruption of GPS/navigation bands.

In accordance with one embodiment, the signal generator 606 and corresponding amplifier 608, may be configured to generate signals from DC to 30 GHz. In another embodiment, a signal generator 606, with corresponding amplifier 608, is incorporated to generate disruptive signals in the 800-900 MHz, 1000 MHz-1.8 GHz, and 2.0 GHz-2.6 GHz frequency ranges, or other known control/navigation signal frequency ranges. In one particular embodiment, a signal generator 606 for each of the 900 MHz frequency band, the 1.2 GHz frequency band, the 1.5 GHz frequency band, and the 2.4 GHz frequency band, with corresponding amplifiers 608 are incorporated into the portable countermeasure device 600. Additionally, the signal generator 606 may be in communication with memory (not shown) that stores alternative command signals for spoofing or hacking, as will be known in the art, a particular control frequency. In such embodiments, the signal generator 606 may be operable to transmit a different navigation signal (altering the coordinates the drone is receiving from navigation satellites/commands), transmit a control signal indicating the drone should land or return to home, or the like. It will be appreciated that such signals generated via the signal generator 606 may be output in addition to noise, jamming, or the like, or in place thereof.

The portable countermeasure device 600 may have multiple modes of operation. The modes may include, but are not limited to, an engaged mode, a standby mode, an offline mode, a repair mode, a low-power mode, and an ancillary mode, among other modes. The engaged mode may correspond to when the portable countermeasure device 600 is picked up and ready to emit a disruptive signal if the activator 610 is engaged. The portable countermeasure device 600 may change into the engaged mode when: 1) the device is picked up by a user and activated, such as by pushing a button/engaging a switch; 2) the device receives a command from the UAVTMS 102 to enter engaged mode; 3) an orientation of the device matches a predefined criteria and touch sensors indicate a person is holding the device; 4) an RF signal corresponding to a UAV is identifier, or some other mechanism. The portable countermeasure device 600 may enter into an ancillary mode when coupled to an external system, such as a car, smartphone, or some other device. The portable countermeasure device 600 may couple to the external system through a wireless or wired (e.g., an auxiliary cable) connection. When in a low-power mode, the portable countermeasure device 600 may limit, reduce, or restrict communications with the UAVTMS 102 as well as reduce other non-essential features such as turning off the display.

The portable countermeasure device 600 can include various additional circuitry, such as, for example, global positioning (GPS) circuitry, compass circuitry, proximity sensors, distance sensors, gyroscope, ambient light sensors, microphone, camera, touch sensors, and other circuitry. The portable countermeasure device 600 can include a processor configured to communicate with the additional circuitry. The processor can calculate a GPS location of the portable countermeasure device 600. The processor can calculate a bearing of the portable countermeasure device 600 via the compass circuitry. Similarly, the processor can record audio and video via the microphone and camera, determine whether a hand is holding on to each grip of the portable countermeasure device 600 using touch sensors, and monitor orientation and angular velocity via the gyroscope. The audio can be recorded via audio sensors 504 (FIG. 5), video can be recorded via video sensors 502 and radio frequency can be recorded via a RF sensor 510, each of which can be included as part of the portable countermeasure device 600. When a drone is detected, the processor can utilize the distance sensors to determine how far the drone is away. The processor can transmit the location, orientation, distance, and all other data to the UAVTMS 102 for further processing. In some embodiments, the transmission of the data can occur on an interval or in response to an event.

The portable countermeasure device 600 can transmit different subsets of information based on a mode of the portable countermeasure device 600. As an example, the portable countermeasure device 600 may transmit a GPS location on a first interval in a standby mode and a second interval in an engaged mode, where the first interval is longer than the second interval. The video and audio signals may be transmitted during the engaged mode but excluded from transmission during the standby mode. The portable countermeasure device 600 may transmit the orientation and compass bearing information based on the movement of the portable countermeasure device 600 and/or the mode of the device. In one embodiment, the portable countermeasure device 600 transmits orientation and bearing information more frequently during an engaged mode than in other modes. All of the data from the portable countermeasure device 600 can be time-stamped as to when each measurement or reading occurred. As an example, the heading information from the compass and GPS information can be transmitted over time with timestamps for each measurement. The measurements can be sent iteratively as a collection of timestamps and corresponding measurements. In one example, the heading information can be measured every 20 milliseconds and sent once every two seconds with 10 timestamped headings being sent in each message.

In accordance with the example embodiment of FIG. 6, the optional battery pack 616 supplies suitable power to the disruptions components 604 of the portable countermeasure device 600. In one non-limiting example, the battery pack 616 may be implemented as a rechargeable battery, including, for example and without limitation, a lithium-ion battery, a lithium-ion polymer battery, a nickel-metal hydride battery, lead-acid battery, nickel-cadmium cell battery, or other suitable, high-capacity source of power. In other embodiments, a non-rechargeable battery may be utilized, as will be appreciated by those skilled in the art. According to one exemplary embodiment, the battery pack 616 is implemented in a magazine form factor, capable of insertion into a battery well 618 (similar to the magazine well of the lower receiver of a rifle). It will be appreciated that such an implementation will be natural to a soldier or law enforcement officer, allowing utilization of existing magazine carrying devices for carrying additional battery packs 616, familiarity with changing a battery pack 616, as well as maintain the balance of the portable countermeasure device 600 similar to those rifles with which the soldier or law enforcement officer is most familiar. In accordance with another embodiment, the portable countermeasure device 600 may utilize an auxiliary cable to a backpack power supply, a remote power source, a portable generator, fuel cell, vehicle interface, or the like. Furthermore, the skilled artisan will appreciate that the battery pack 616 is not limited in form and can be complementary to the form-factor of the portable countermeasure device 600, for example, similar to a rectangular magazine, tubular magazine, and the like, as well as being integrated within the body 602 of the portable countermeasure device 600, i.e., a structural battery as discussed above.

According to another embodiment, the portable countermeasure device 600 may include a display 620 operable to display remaining power levels of the battery pack 616, the effective range of the output of the signal disruption components 604 relative to power supply level, or the like. This optional display 620 may be connected to control components (not shown), and be customized to display the frequency selected for output by the jammer components 604. In such an embodiment, the display 620 may be implemented as an LED, LCD, OLED, or another suitable display type. In some embodiments, the display 620 may fold out of the body 602 of the portable countermeasure device 600 during use and fold back into the body 602 when not in use. The display 620 can include LEDs or other indicators within sights of the portable countermeasure device 600 to indicate a direction.

The sights may also render one or more rings that move inward or outward to convey information. A speed of movement of the rings a color of the rings, and a style of the ring may convey other information. As an example, a green ring may radiate inward when an authorized drone is within the sights. The ring may be yellow if the status of the drone is unknown and red if the status of the drone is unauthorized or hostile. The ring may radiate outward more quickly when a drone is near the sights but not within the sight and may radiate outward more slowly when there is no drone near the sights. As such, a user of the portable countermeasure device 600 may know how to maneuver the portable countermeasure device 600 when looking through the sights to find a drone without needing to pull back from the sights. In some embodiments, a display in the sights may form a bullseye over the drone when the drone is within the sights.

The display 620 may include an external display, which may be a secondary display (or tertiary, quaternary, etc.) or a primary display. In some embodiments, the portable countermeasure device 600 may connect to a vehicle and render a display on the console display of the vehicle. In other embodiments, the portable countermeasure device 600 may render content on a display device of a smartphone, a television, a monitor, smart-glasses, or some other external display 620. The portable countermeasure device 600 may connect to the external display 620 via wirelessly (such as via HDMI over Wi-Fi, Wireless Display (WiDi), Miracast, AirPlay, or some other protocol) or via a wired connection (such as via HDMI, VGA, DisplayPort, USB, or some other connection). The portable countermeasure device 600 may couple to the vehicle through a wireless or wired (e.g., an OBD port) connection to obtain information from the vehicle. As an example, the portable countermeasure device 600 can retrieve GPS data, compass data, velocity data, and other data from a vehicle.

The portable countermeasure device 600 can utilize the vehicle data to determine positioning information among other data. In one embodiment, the portable countermeasure device 600 may be in a truck of the vehicle, which may block GPS signals from entering into the trunk. In this embodiment, the portable countermeasure device 600 can receive the vehicle information and transmit the positioning information to the UAVTMS 102 for further processing. In some embodiments, the portable countermeasure device 600 may transmit data to the UAVTMS 102 via a network connection of the vehicle. As an example, the vehicle may have a cellular or wireless data connection that may be usable by the portable countermeasure device 600 to convey information to the UAVTMS 102. In various embodiments, the portable countermeasure device 600 can render an augmented or virtual reality user interface on the display 620. In one embodiment, the display 620 corresponds to smart glasses or another display, and the portable countermeasure device 600 renders indicators onto the display 620 around one or more UAVs to help a user see the UAVs.

The portable countermeasure device 600 depicted in FIG. 6 utilizes a single, multi-function directional antenna 622, extending outward from the body 602 in a direction away from the user. It will be understood that other embodiments, as discussed below, may utilize multiple directional antennae in accordance with the number of disruptive signals to be generated, the types of disruptive signals, desired range, and the like. It will be appreciated that, maintaining a suitable comparison to a rifle, the antenna 622 replaces the barrel of a rifle, thereby maintaining the familiarity and ease of operation by the soldier or law enforcement officer. In accordance with some embodiments, the antenna 622 may be "hot-swappable" or "replaceable" in the field, allowing for different directional antennae to be used by the portable countermeasure device 600 in accordance with the battlefield conditions. For example, the distances involved in commercial drone disruption may utilize less power-intensive disruptive signals than military drone disruption. In such an embodiment, a suitable antenna may not need to be as large, or a different design antenna may be used. In another example, in the event that the antenna 622 is damaged while in the field, an expedient repair capable of being performed by the soldier or law enforcement officer is a replacement of the antenna 622, as opposed to having to submit the portable countermeasure device 600 to an armorer or electronics specialist for repair, thereby keeping the portable countermeasure device 600 operative.

In some embodiments, the portable countermeasure device 600 can emit a broadband of signals to target a variety of UAVs. In other embodiments, the portable countermeasure device 600 can emit a narrow band of targeted signals to target a specific type of UAVs. In one embodiment, the UAVTMS 102 can identify a type of RF signal being used by a UAV via a device 112, a portable countermeasure device 600, or through aggregated data from various devices 112 and portable countermeasure devices 600 among other data. The UAVTMS 102 can transmit a specific signal profile to one or more portable countermeasure devices 600. The specific signal profile can correspond to a targeted narrow band of frequency. In one embodiment, the portable countermeasure devices 600 can be deployed with a broadband signal profile and switched to a narrow band signal profile once an RF signal is identified for a specific UAV. It can be appreciated that narrowing or limiting the band or bands of signals being disrupted while still disrupting an unauthorized UAV from operating in an area is preferable.

In one particular embodiment, the antenna 622 is implemented as a combined, high-gain, directional antenna having a helical cross-section. Other suitable directional antenna, e.g., Yagi, cylindrical, parabolic, long period array, spiral, etc., are also capable of being utilized in accordance with the disclosure set forth herein. According to one embodiment, the antenna 622 may be affixed to one or more movable motors to form a motorized antenna 622. According to various embodiments, the portable countermeasure device 600 may adjust a direction of the motorized antenna 622. In one example, the portable countermeasure device 600 may utilize various sensors on the device and/or data received from the UAVTMS 102 to calculate a position of a UAV. The portable countermeasure device 600 may adjust a position of the motorized antenna 622 to more accurately target the UAV. The adjustment may be based on an orientation of the portable countermeasure device 600, which may be determined using a gyroscope, compass, and GPS position, among other sensors.

Affixed to the top of the body 602, either fixed thereto, or removably attached, e.g., rail attachments, are "iron sights" 624A (with a corresponding sight 624B attached or fixed to the end of the antenna 622), allowing for aiming by the soldier or law enforcement officer of the portable countermeasure device 600 at a target drone. In other embodiments, particularly when the top of the body 602 includes the aforementioned rails, a wide or narrow field of view optical sight may be utilized to allow the soldier or law enforcement officer to target drones beyond the normal field of vision. To avoid unintentional disruption of nearby devices outside the disruption cone 626 directed by the antenna, the sight 624A and/or 624B may be constructed of a suitable non-metallic material. The disruption cone 626 may range from 0 degrees to 180 degrees, including for example and without limitation, 0 to 120 degrees, 0 to 90 degrees, 0-45 degrees, 20 to 30 degrees or variations thereof. The effective range of the portable countermeasure device 600 may extend outward from the antenna 622 at varying ranges, from 0 meters outward greater than or equal to 400 meters in accordance with the power supplied to the disruption components 604. Accordingly, it will be appreciated by those skilled in the art that the maximum range of the portable countermeasure device 600 may be extended or reduced in accordance with the amount of power supplied to the disruption components 604, the ratio of power to time on target, and the like.

In operation, the soldier or law enforcement officer will target a drone hovering or flying in an unauthorized area by aiming the antenna 622 of the portable countermeasure device 600 in a manner similar to a regular firearm. That is, the soldier or law enforcement officer, using the iron sights or optical sights, directs the antenna 622 of the portable countermeasure device 600 toward the drone. After ensuring that sufficient power is available, and the drone is within the effective range of the portable countermeasure device 600, the soldier or law enforcement officer activates the activator 610 (for all control frequency bands) and/or the activator 612 (for all GPS/navigation frequency bands) to activate the control circuit (not shown), which regulates the power from the battery 616 (or other power source) to the disruption components 604. In an alternative embodiment, a single activator (not shown) may control activation of all disruption components 604, thereupon simultaneously or sequentially generating disruptions signals as described herein when the activators 610 and 612 are activated. When disrupting multiple frequency bands, e.g., control signals, Wi-Fi and/or GPS, multiple disruption signal generators 606 and amplifiers 608 are activated to produce the desired disruption signal, e.g., noise, spoofing, alternate commands, alternate coordinates, etc., on the selected frequency bands. The disruptive signal is then directed through the single antenna 622 (capable of handling multiple frequency bands) or multiple antennae toward the drone at which the portable countermeasure device 600 is aimed. The disruption cone 626 then extends outward from the portable countermeasure device 600 toward the drone, disrupting control and GPS signals effectively negating the presence of the drone in the unauthorized area. Alternative embodiments disclosed herein include generating, via the signal generator 606, alternative commands to the drone, instructing the drone to land, change direction, change video broadcast stream, stop video streaming/recording, thereby overriding the original control signals. Furthermore, the portable countermeasure device 600 may be configured to transmit altered navigation coordinates, confusing the drone or forcing the drone to leave (or travel to) a particular area. The soldier or law enforcement officer then maintains his/her aim on the drone until the drone falls, retreats, loses power, or the like. The activator(s) 610-612 may then be deactivated by the law enforcement officer or soldier and the disabled drone may then be recovered by the appropriate authority for determination of the owner.

According to one example embodiment, the portable countermeasure device 600 includes hardware, software, and/or any suitable combination thereof, configured to interact with an associated user, a networked device, networked storage, remote devices, detector systems, tracking systems (e.g., the UAVTMS 102), and the like. In such an example embodiment, the portable countermeasure device 600 may include a processor, which performs signal analysis, ballistic analysis, or the like, as well as execution of processing instructions which are stored in memory connected to the processor for determining appropriate signal generation for disruption, power supply management, and the like. It will be appreciated that the inclusion of a suitable processor is optional, depending upon the ruggedness of the underlying implementation of the portable countermeasure device 600. Further, it will be understood that separate, integrated control circuitry, or the like, may be incorporated into the portable countermeasure device 600 so as to avoid interference of operations by the disruption components 604, or the like.

According to another example embodiment, the portable countermeasure device 600 may include a selector control (not shown), which may be located on the exterior of the portable countermeasure device 600. Such a selector control may be operable to select a frequency or frequencies to be generated by the at least one signal generator and amplified by the corresponding at least one amplifier 608. In accordance with one alternate embodiment, a variable amplifier may be used, whereupon power supplied to the signal generators 606 is modified, without increasing the power drain of the portable countermeasure device 600. It will be appreciated that the selector control may be implemented to provide ease of use to the soldier or law enforcement official in the field to reflect the desired target of the portable countermeasure device 600.

Turning now to FIG. 7, a diagram is shown illustrating a communication link between the UAVTMS 102 and one or more portable countermeasure devices 600. As discussed briefly above in association with the description of FIG. 1 and FIG. 4, the portable countermeasure devices 600 may be included in the plurality of system devices (e.g., devices 112 and 402). According to various aspects of the present disclosure, the system includes communication links, such as the network 108, to each of these devices and sensors. In a particular embodiment, the portable countermeasure devices 600 and the UAVTMS 102 may share a bilateral communication link, thus allowing for these system components to transmit and receive information relating to detected (or suspected) UAVs. According to various aspects of the present disclosure, the communication link may support various types of electronic communications, such as broadband, cellular, LTE, Wi-Fi, WLAN, Bluetooth, radio frequency, etc. In certain embodiments, the system may also include wired connections to the portable countermeasure devices 600 via Ethernet or other appropriate types of wired networking solutions.

Continuing with FIG. 7, the portable countermeasure devices 600 may each support a mesh network, or similar wireless network, for communicating data throughout the system. For example, the UAVTMS 102 may transmit a signal throughout the network, where the signal may indicate a particular portable countermeasure device 600 as the intended destination. In embodiments where the destination device is outside of the direct range of the UAVTMS 102, other closer portable countermeasure devices 600 may receive the transmitted message and relay the message to other nearby devices, and this process may continue until the destination device receives the transmitted message. In certain embodiments, the UAVTMS 102, as well as the portable countermeasure devices 600, may each store a table or index of the devices maintained within the system, and this table may include information such as MAC addresses, history of timestamped GPS locations, history of timestamped heading information, video and audio data, the current mode of operation, whether an activator is engaged, whether a disruptive signal is being emitted, a history of modes of operation, a history of activator engagements, a history of disruptive signals emitted, a type of the disruptive signal emitted, countermeasure sensors or capabilities, power levels, etc., thus allowing for the system devices/components to best identify which portable countermeasure devices 600 should receive particular UAV information. In some embodiments, each message may have an integer stored in a header of the messages referred to as a time to live value such that after each closer portable countermeasure device 600 relays the message, the portable countermeasure device 600 first decrements the time to live value before doing so to prevent messages from looping through the network.

In some embodiments, the UAVTMS 102 can render a user interface on a display to show a status of portable countermeasure devices 600 deployed in an area. The user interface can be rendered via a web page, a native application, or via another means. The user interface can include a map with any UAVs, known aerial vehicles, physical structures, sensing devices 112, and portable countermeasure devices 600. The UAVTMS 102 can update the location of the portable countermeasure devices 600 on the map in real-time as the portable countermeasure devices 600 is moved about the area. An icon can be used for each portable countermeasure device 600. In some embodiments, the icons can be customized on a per portable countermeasure device 600 basis. The icons can change to indicate various aspects of the portable countermeasure devices 600. As an example, an icon may glow when the portable countermeasure devices 600 is activated and emitting a disruptive signal.

The icon may have an arrow pointing in a direction of the last compass bearing received from the portable countermeasure device 600. The icon may turn orange if the portable countermeasure devices 600 enters into low power mode and the icon may turn grey if the portable countermeasure devices 600 is not heard from for a predefined period of time. The UAVTMS 102 may aggregate radio frequency data from various devices 112 and portable countermeasure devices 600 to generate a visual representation of radio frequency activity on the map. In some embodiments, different frequency bands can be assigned a color and markers can be shown on the map with the corresponding color based on the radio frequency activity. The user interface may include a fading trail that follows each portable countermeasure device 600 as movement occurs to show a history of the movement. In some embodiments, the user interface includes a playback option so that a user can select a time from the past and "playback" what occurred on the map at a prior point.

In some embodiments, the UAVTMS 102 may receive an indication from a portable countermeasure device 600 that a UAV may be in an area. As an example, the portable countermeasure device 600 can identify a radio frequency is being emitted in an area, a sound identifiable with flight is recorded in an area, or some other indication. The UAVTMS 102 can search video feeds or other data available in the area or deploy a drone to record the area. By aggregating data from various sources, the UAVTMS 102 can verify whether or not a UAV is present in the area identified by the portable countermeasure device 600. If a UAV is verified, a message can be sent back to the portable countermeasure device 600 that sent the indication (or another portable countermeasure device 600 in the area) to instruct a user to engage with the UAV. In addition, the UAVTMS 102 may deploy various other countermeasure options available as can be appreciated.

According to various aspects of the present disclosure, the UAVTMS 102 and the one or more portable countermeasure devices 600 may enable the system to locate a UAV in a particular airspace via generating directional vectors. In one embodiment, a processor operatively connected to a portable countermeasure device 600 receives UAV data from the UAVTMS 102, wherein the UAV data comprises information relating to a first location of a UAV in the particular airspace. For example, the information relating to the first location may include sensor data such as radar data, video data, RF data, etc., from which the system may determine a direction (e.g., a direction vector) from which the UAV is approaching, an approximate location of the UAV, etc. In certain embodiments, the processor determines a second location of the portable countermeasure device 600 and analyzes the UAV data and the second location to determine relational data comprising a directional vector from the second location to the first location. According to various aspects of the present disclosure, at least one sensor of the portable countermeasure device 600 may determine an orientation of the portable countermeasure device 600 (e.g., via global positioning sensors, magnetic field detection, accelerometers, etc.), wherein the relational data is determined based at least in part on the orientation of the portable countermeasure device 600. In one embodiment, the directional vector is from a front facing direction at the second location according to the orientation of the portable countermeasure device 600. In particular embodiments, the communication link between the one or more portable countermeasure devices 600 and the UAVTMS 102 allows for transmitting and receiving this directional information (and other UAV related information) in real-time.

Furthermore, the processor renders an indication of the first location (e.g., the UAV location) based at least in part on the directional vector. According to various aspects of the present disclosure, rendering the indication of the first location includes displaying a visual indicator on a display 620 operatively connected to the portable countermeasure devices 600, outputting an auditory indicator of direction from a speaker, and adjusting a direction of a motorized antenna. In particular embodiments, the display device, speaker, and motorized antenna may each be integrated within the portable countermeasure device 600, or may be separate from (but operatively connected to) the portable countermeasure device 600, for example, via a smartphone (or the like) or another portable device. The portable countermeasure device 600 can render a site map on the display 620. The site map can include indicators for any identified UAVs. The portable countermeasure device 600 can receive positioning information for one or more UAVs and render the locations of the UAVs on the site map. The portable countermeasure device 600 can also receive positioning information for one or more other portable countermeasure devices 600 and render the locations of the UAVs on the site map. The positioning information for the one or more UAVs and/or one or more additional portable countermeasure devices 600 can be sent from the UAVTMS 102 and/or from other portable countermeasure devices 600.

Proceeding now to FIG. 8, a flowchart is shown illustrating an exemplary countermeasure device selection process 800, according to various aspects of the present disclosure. As mentioned above in the discussion of step 812 of the process 800, in response to the UAVTMS 102 detecting a UAV, the system may determine an action to take based on a predetermined rule set. The action can include a wide variety of actions, such as ignore the UAV because it is known to be trusted, or attempt to locate the controller of the UAV because it is identified as a threat. According to various aspects of the present disclosure, and as will be discussed in greater detail immediately below, the determined action may include interacting with one or more handheld countermeasure devices, such as, for example, by transmitting an indication of the UAV to a handheld portable countermeasure device 600.

In one embodiment, the process 800 begins at step 802, where the system compares information from the detected UAV to information relating to one or more portable countermeasure devices. According to various aspects of the present disclosure, the system may determine the detected UAV's position with respect to the sensors that detected the UAV based on aspects of received video frames, such as the size of the UAV in the video frame, the orientation of the video sensor while detecting the UAV, the video sensor's rate of reorientation in order to track the UAV through the airspace, etc. In particular embodiments, the information relating to the countermeasure devices 600 may include GPS location data. In certain embodiments, the portable countermeasure devices 600 may include GPS sensors, and the devices may periodically transmit their GPS locations to the UAVTMS 102 to be stored in a system database, such as the database 106. In particular embodiments, the system may further compare the distance between the detected UAV and the one or more countermeasure devices 600 to a predetermined distance threshold. For example, if the detected UAV is within 1000 meters (or any appropriate distance) from a particular countermeasure device, that particular countermeasure device may be selected/identified as the target for transmitting information relating to the detected UAV(s).

At step 804, the system determines if the detected UAV is within the predetermined distance threshold from one or more portable countermeasure devices 600. In various embodiments, if a particular portable countermeasure device known to the system is outside of a predetermined distance threshold, the process 800 may terminate. However, in one embodiment, if the system determines that one or more portable countermeasure devices are within the predetermined distance threshold, the system may proceed to step 806.

In one embodiment, at step 806, the system transmits the UAV information to the one or more identified portable countermeasure devices 600. In particular embodiments, the system may transmit all of the information received by the system sensors when detecting the UAV (e.g., video data, audio data, RF data, etc.). In various embodiments, the system may transmit only a portion of the information received by the system sensors, based on factors such as available bandwidth, most relevant data (for example, if video data was preferable over audio data), the ability for the portable countermeasure device to receive and process the data, etc.

In one embodiment, FIG. 9 shows a flowchart of an exemplary portable countermeasure device data collection and transmission process, according to one aspect of the present disclosure. As discussed above in association with the description of FIG. 8, the UAVTMS 102 may transmit information relating to a detected UAV to one or more portable countermeasure devices 600. According to various aspects of the present disclosure, the system identifies or selects the one or more portable countermeasure devices 600 for receiving the data based on the countermeasure devices' locations with respect to the detected UAVs, based on the particular type(s) of UAV data received, based on the ability of particular portable countermeasure devices to successfully eliminate the UAV threat, etc. In some embodiments, the system broadcasts threat information to the one or more portable countermeasure devices 600. Each portable countermeasure device 600 can receive the threat information, process the threat information, and determine whether the threat is proximate to the current location of the respective portable countermeasure devices 600.

In a particular embodiment, the process 900 begins at step 902, where one or more selected portable countermeasure devices receive the detected UAV information. According to various aspects of the present disclosure, the system includes a communication link between the one or more portable countermeasure devices, over which the UAV information is transmitted. In certain embodiments, the communication link is supported by a wireless communication network, such as a cellular network (e.g., 3G LTE, 4G LTE, 5G LTE, etc.). In various embodiments, the communication link may be supported by other methods, such as radio frequency transmitters and receivers installed at both the UAVTMS 102 and the portable countermeasure devices 600. In certain embodiments where the system includes a plurality of portable countermeasure devices 600 located throughout a particular area, each portable countermeasure device may contribute to the formation of a mesh network, thus allowing for each portable countermeasure device to relay received messages to other surrounding portable countermeasure devices. In some embodiments, various RF sensors of the UAVTMS 102, which are used to monitor for drones, can also communicate with the portable countermeasure devices 600.

In particular embodiments, the system may include a plurality of signal repeaters throughout a particular area, thus allowing for the range of a signal transmitted by the UAVTMS 102 to be extended for reaching portable countermeasure devices 600 located at distances far from the UAVTMS 102. The signal repeaters can also be used to monitor for signals of various drones to identify potential threats. In certain embodiments, the portable countermeasure device may be operatively connected to an additional portable device, where the additional portable device may include hardware for receiving and transmitting various signal types (e.g., cellular, RF, Wi-Fi, Bluetooth, etc.), and the additional portable device may be attached to the portable countermeasure device 600, or a handler of the countermeasure device may carry the additional device. In a particular embodiment, a smartphone or similar device may receive electronic communications from the UAVTMS 102 over the communication link. According to various aspects of the present disclosure, the smartphone may process information received from the UAVTMS 102 and subsequently transmit the processed information to the portable countermeasure device 600, or the smartphone may transmit the information unprocessed. In at least one embodiment, the smartphone and the portable countermeasure device may communicate via a wired connection, or over a wireless connection such as Bluetooth, or the like. Furthermore, the portable countermeasure device need not be deployed on the ground (e.g., currently being handled by a user) to receive communications from the UAVTMS 102. For example, the portable countermeasure device 600 may be in transport (e.g., in an automobile), and still receive information relating to a nearby detected UAV, and this information may be stored until the device is unloaded, or the information may be further transmitted to a user's smartphone, the user's automobile computing system and onboard display for alerting the user, etc.

Proceeding now to step 904, the portable countermeasure devices 600 can display the received UAV information. In one embodiment, the UAV information may include the UAV's distance from the portable countermeasure device 600, the direction from the portable countermeasure device at which the UAV is located, the UAV's detected speed or velocity, the UAV type, etc. In various embodiments, the portable countermeasure devices 600 may include a digital screen or similar display, LEDs, a scope (e.g., a rifle scope) or similar sight, etc., each capable of displaying an indication of the UAV's location. For example, a grid of LEDs may be illuminated to indicate the direction from which a UAV is approaching. In another example, an optical glass display within a scope may guide a user to point the countermeasure device in the air towards the UAV, and the scope may furthermore display a circle or similar ring around the UAV once it is identified within the airspace. In certain embodiments, a virtual reality headset, glasses, or the like, may receive the UAV location data and display instructions for guiding a user to the UAV within the airspace. As mentioned immediately above, the portable countermeasure device may further transmit an indication of the UAV's location to a handler's smartphone or another display (such as an automobile onboard display), for alerting the device handler of the UAV threat.

In various embodiments, the system may proceed to step 906, where the system generates a countermeasure signal based on information relating to the detected UAV (e.g., the information received from step 902). According to various aspects of the present disclosure, the portable countermeasure device 600 may store one or more types of waveforms that may be transmitted towards one or more UAVs for jamming the UAVs or otherwise blocking the UAVs from continuing stable or expected operation. In at least one embodiment, the portable countermeasure device may dynamically generate new waveforms based on UAV information received at step 902, or based on information received at the portable countermeasure device directly from the UAV (prior to or after locating the UAV). The portable countermeasure device 600 can generate commands to the UAVs to land, decelerate, turn around and fly in the opposite direction, or perform one or more other maneuvers.

Proceeding now to step 908, if the portable countermeasure device has not yet identified the UAV, the process returns to step 904. However, if at step 908 the portable countermeasure device identifies the UAV (e.g., it is located in the particular airspace), the process 900 may proceed to step 10. In one embodiment, step 910 is an optional step where the portable countermeasure device may transmit one or more countermeasure signals at the UAV for disarming the UAV, or otherwise eliminating the threat presented by the UAV. As discussed in the U.S. Non-Provisional patent application Ser. No. 16/005,905, filed on Jun. 12, 2018, and entitled "DUAL-GRIP PORTABLE COUNTERMEASURE DEVICE AGAINST UNMANNED SYSTEMS," which is incorporated by reference herein, the portable countermeasure device may transmit various signals, directed at the UAV, for jamming the UAV.

In various embodiments, at step 912, the portable countermeasure device 600 receives additional information of the UAV and/or relating to the UAV. According to various aspects of the present disclosure, the portable countermeasure device 600 may include a video sensor, and thus may collect video frames of the UAV at a closer range than the UAVTMS 102. In a particular embodiment, the UAVTMS 102 may initially detect the UAV based on identified RF signals, but the UAV may be too far away from the systems video sensors for collecting video data of the UAV. In some embodiments, the UAVTMS 102 may be close enough for video sensors to capture the UAV, but the portable countermeasure device 600 can provide a different perspective of video imaging or different types of sensors. As an example, the portable countermeasure device 600 may include a temperature sensor, an infrared emitter and sensor, an ultraviolet emitter and sensor, or some other sensor. Thus, in various embodiments, the UAVTMS 102 may alert one or more portable countermeasure devices 600 near the detected UAV for collecting additional data of the UAV, which may be based on sensors of the portable countermeasure devices 600. In certain embodiments, the portable countermeasure device may also include RF sensors (or other appropriate sensors) for detecting waveforms being received at or transmitted from the UAV. Accordingly, the data/information received by the portable countermeasure device may augment, bolster, verify, or overall validate and strengthen the data collected by the UAVTMS 102 (e.g., the data received by the portable countermeasure device at step 902). In some embodiments, the UAVTMS 102 can collect the data used to identify UAVs from the portable countermeasure devices 600.

Proceeding now to step 914, the portable countermeasure device 600 may transmit the collected information/data back to the UAVTMS 102. As discussed above, the system includes a communication link between the one or more portable countermeasure devices and the UAVTMS 102. Accordingly, in response to collecting additional data relating to a UAV, the portable countermeasure devices 600 may transmit the information to the UAVTMS 102 for processing, storing, determining appropriate countermeasure actions, adjusting confidence measures, alerting additional authorities, etc. In at least one embodiment, the communication link between the portable countermeasure devices and the UAVTMS 102 may be a bilateral link, and data may be transmitted/received between the system components may be automatic and continuous. In particular embodiments, the portable countermeasure device may only transmit and receive data to and from the UAVTMS 102 at predetermined time intervals, when the portable countermeasure device has sufficient power, etc.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media that can be accessed by a computer, or downloaded through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid-state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general-purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general-purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represents examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide-area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications, as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method comprising:
receiving, via at least one computing device, sensor data associated with an object in a particular airspace from at least one radio frequency sensor;
analyzing, via the at least one computing device, the sensor data relating to the object to identify a type of radio frequency (RF) signal being used by the object; and
generating, via the at least one computing device, at least one disruption signal on at least one targeted band of spectrum based on the type of RF signal being used by the object.

2. The method of claim 1, further comprising:
generating, via the at least one computing device, at least one initial disruptive signal on a broadband signal prior to identifying the type of the RF signal being used by the object; and
switching to the at least one targeted band of spectrum in response to identifying the type of RF signal being used.

3. The method of claim 1, further comprising receiving, via the at least one computing device, a specific signal profile comprising the at least one targeted band of spectrum.

4. The method of claim 3, wherein the specific signal profile is received via at least one bilateral communication link between a portable countermeasure device and a tracking system.

5. The method of claim 1, wherein the particular airspace is proximate to the at least one radio frequency sensor.

6. The method of claim 1, wherein the at least one radio frequency sensor comprises at least one software-defined radio (SDR).

7. The method of claim 6, further comprising dynamically configuring the at least one software-defined radio to monitor a particular range of radio frequency spectrum.

8. A system, comprising:
a tracking system comprising at least one first computing device, wherein the at least one first computing device is configured to:
receive sensor data associated with an object in a particular airspace from at least one radio frequency sensor; and analyze the sensor data relating to the object to identify a type of RF signal being used by the object; and a portable countermeasure device comprising at least one second computing device, wherein the at least one second computing device is configured to:

generate at least one disruption signal on at least one targeted band of spectrum based on the type of RF signal being used by the object.

9. The system of claim 8, wherein the at least one second computing device is configured to generate at least one disruption signal on at least one targeted band of spectrum to minimize an impact on non-targeted devices.

10. The system of claim 8, wherein the at least one first computing device is in communication with the at least one second computing device via a bilateral communication link.

11. The system of claim 8, wherein the portable countermeasure device further comprises a directional antenna, and the at least one second computing device is further configured to
generate the at least one disruption signal towards the object via the directional antenna.

12. The system of claim 8, wherein the portable countermeasure device further comprises at least one signal disruption component comprising at least one signal generator and at least one amplifier coupled to the at least one signal generator, wherein the at least one signal generator is configured to generate the at least one disruptive signal on the at least one targeted band of spectrum and the at least one amplifier is configured to amplify the at least one disruptive signal.

13. The system of claim 8, wherein the at least one first computing device is further configured to generate aggregated data from a plurality of sources comprising the at least one radio frequency sensor, wherein analyzing the sensor data to identify the type of RF signal being used by the object further comprising analyzing the aggregated data from the plurality of sources.

14. The system of claim 8, wherein the at least one first computing device is further configured to:

analyze the sensor data to determine a location of the object in the particular airspace; and determine that the portable countermeasure device is within a predetermined distance threshold from the location of the object.

15. The system of claim 8, wherein the at least one first computing device is further configured to transmit real-time information relating to the object to the at least one second computing device.

16. The system of claim 15, wherein the portable countermeasure device is configured to generate a countermeasure waveform based at least in part on the real-time information relating to the object.

17. A non-transitory computer-readable medium embodying a program that, when executed by at least one computing device, causes the at least one computing device to:

receive sensor data associated with an object in a particular airspace from at least one radio frequency sensor;

analyze the sensor data relating to the object to identify a type of RF signal being used by the object; and cause generation of at least one disruption signal on at least one targeted band of spectrum based on the type of RF signal being used by the object.

18. The non-transitory computer-readable medium of claim 17, wherein the program further causes the at least one computing device to receive the sensor data by recording a radio frequency via the at least one radio frequency sensor.

19. The non-transitory computer-readable medium of claim 17, wherein the at least one disruption signal comprises at least one command to the object based on the type of RF signal being used.

20. The non-transitory computer-readable medium of claim 17, wherein the type of RF signal being used comprises a frequency of the RF signal being used.

* * * * *